US005179397A

United States Patent [19]

Ohzeki et al.

[11] Patent Number: 5,179,397

[45] Date of Patent: Jan. 12, 1993

[54] IMAGE FORMING APPARATUS WITH CONSTANT VOLTAGE AND CONSTANT CURRENT CONTROL

[75] Inventors: Yukihiro Ohzeki; Tatsunori Ishiyama; Koichi Hiroshima; Junji Araya, all of Yokohama; Yasushi Sato, Kawasaki; Kimio Nakahata, Kawasaki; Akihiko Takeuchi, Yokohama; Takayasu Yuminamochi, Yokohama; Hiroto Hasegawa, Kawasaki; Koichi Tanigawa, Tokyo; Yasumasa Ohtsuka, Yokohama, all of Japan

[73] Assignee: Canon Kabushiki Kaisha, Tokyo, Japan

[21] Appl. No.: 500,795

[22] Filed: Mar. 28, 1990

[30] Foreign Application Priority Data

| | | | |
|---|---|---|---|
| Apr. 3, 1989 | [JP] | Japan | 64-85189 |
| Apr. 4, 1989 | [JP] | Japan | 64-86301 |
| May 18, 1989 | [JP] | Japan | 64-122868 |
| Jul. 31, 1989 | [JP] | Japan | 64-198265 |

[51] Int. Cl.$^5$ .................... G01D 15/14

[52] U.S. Cl. .................... 346/160; 355/271

[58] Field of Search .................... 355/271, 272, 273, 219, 355/274; 430/126; 346/160

[56] References Cited

U.S. PATENT DOCUMENTS

| | | | |
|---|---|---|---|
| 3,640,249 | 2/1972 | Young . | |
| 3,781,105 | 12/1973 | Meagher | 355/274 |
| 3,837,741 | 9/1974 | Spencer . | |
| 3,860,436 | 1/1975 | Meagher . | |
| 3,924,943 | 12/1975 | Fletcher | 355/274 |
| 3,936,175 | 2/1976 | Jones . | |
| 3,937,572 | 2/1976 | Gaynor et al. | 355/217 |
| 3,954,333 | 5/1976 | Goel | 355/273 |
| 4,136,942 | 1/1979 | Nakahata et al. | 355/3 CH |
| 4,190,348 | 2/1980 | Friday | 355/274 |
| 4,338,017 | 7/1982 | Nishikawa . | |
| 4,341,457 | 7/1982 | Nakahata et al. | 355/3 CH |
| 4,379,630 | 4/1983 | Suzuki | 355/274 |
| 4,401,383 | 8/1983 | Suzuki et al. . | |
| 4,402,591 | 9/1983 | Nakahata | 355/3 TR |
| 4,484,811 | 11/1984 | Nakahata et al. | 355/14 CH |
| 4,851,960 | 7/1989 | Nakamura et al. | 361/225 |
| 4,860,048 | 8/1989 | Itoh et al. | 355/208 |
| 4,977,430 | 12/1990 | Florack et al. | 355/274 |
| 5,034,777 | 7/1991 | Ohzeki et al. | 355/274 |

FOREIGN PATENT DOCUMENTS

| | | |
|---|---|---|
| 0297911 | 1/1989 | European Pat. Off. . |
| 0339673 | 11/1989 | European Pat. Off. . |
| 0367245 | 5/1990 | European Pat. Off. . |
| 3034089 | 4/1981 | Fed. Rep. of Germany . |
| 56-35159 | 4/1981 | Japan . |
| 60-256173 | 12/1985 | Japan . |
| 61-151553 | 7/1986 | Japan . |

*Primary Examiner*—R. L. Moses

*Attorney, Agent, or Firm*—Fitzpatrick, Cella, Harper & Scinto

[57] ABSTRACT

An image forming apparatus includes a movable image bearing member; an image forming device for forming a toner image on the image bearing member; image transfer device for transferring the toner image from the image bearing member to a transfer material at an image transfer station, wherein the transfer device includes a charging member press-contacted or faced to the image bearing member and a device for applying a voltage to the charging member, wherein the voltage applying device applies a voltage to the charging member so that the charging member is constant-voltage-controlled when an image region of the image bearing member is in the transfer station, and the charging member is constant-current-controlled during at least a part of a period when it is not in the transfer station, wherein a voltage V2 applied during the constant voltage control is a voltage V1 appearing in the transfer device during the constant current control multiplied by a coefficient R, in which R is larger than 1.

128 Claims, 18 Drawing Sheets

IMAGE FORMING APPARATUS WITH CONSTANT VOLTAGE AND CONSTANT CURRENT CONTROL

FIELD OF THE INVENTION AND RELATED ART

The present invention relates to an image forming apparatus such as an electrophotographic copying machine or an electrostatic printer, or particularly to an image forming apparatus using an electrostatic transfer process and provided with image transfer means contactable to an image bearing member, such as an image transfer roller or an image transfer belt.

An image forming apparatus has been proposed which comprises an image bearing member and an image transfer member press-contacted thereto to form a nip therebetween, through which a transfer material is passed, while a bias voltage is applied to the transfer member, by which the toner image is transferred from the image bearing member to the transfer material.

FIG. 9 shows a typical example of such an image forming apparatus. A surface of a cylindrical image bearing member in the form of a photosensitive member 1 having a rotational axis extending perpendicular to the sheet of the drawing and rotatable in a direction indicated by an arrow X, is uniformly charged by a charging roller 3 supplied with a voltage from the power source 4. Thereafter, an image information writing means 7 projects image information on the charged surface by a laser beam or through a slit, so that an electrostatic latent image is formed.

The latent image is developed into a toner image by a developing device 9.

With rotation of the photosensitive member 1, the toner image reaches an image transfer position having the nip formed between the photosensitive member 1 and the transfer member in the form of a transfer roller 2 press-contacted thereto. At this time, the transfer material P reaches the transfer position in timed relation with the toner image. At this time, the transfer roller 2 is supplied with a transfer bias to apply electric charge having the polarity opposite to the polarity of the toner to the backside of the transfer material, by which the toner image is transferred from the photosensitive member 1 to the transfer material.

In the apparatus shown in the Figure, the photosensitive member is an OPC (organic photoconductor) photosensitive member, and the process speed is 23 mm/sec. The charging means is in the form of a charging roller 3 which rotates following the photosensitive member 1 to which it is press-contacted. The charging roller 3 is supplied with a DC biased AC voltage to charge the photosensitive member 1 to a negative polarity. The transfer means is in the form of a transfer roller 2 press-contacted to the photosensitive member 1 to rotate following the photosensitive member 1. The transfer roller 2 applies the positive charge to the backside of the transfer material.

The light is projected onto such a portion of the photosensitive member as is to receive the toner, and the developing device 9 carries out reverse-development using toner charged to the polarity which is the same as the charging property of the photosensitive member.

FIG. 10 shows the sequential operation of the apparatus.

The image forming apparatus of such a contact type image transfer system is advantageous from the standpoint of cost over the conventional apparatus using a corona discharger, because the high voltage source is not required. In addition, since the corona wire electrode is not used, the contamination or trouble due to the corona wire do not result. In addition, ozone or nitride production attributable to the high voltage do not occur. Therefore, deteriorations of the photosensitive member and the image quality due to the ozone or nitride can be avoided. However, it is known that the relation (V-I characteristics) between the voltage applied to the transfer roller 2 and the current flowing therethrough significantly varies depending on the ambient conditions.

More particularly, the resistance of the transfer roller is larger by several orders under a low temperature and low humidition condition (15° C. and 10%, which will be called "L/L condition") than under a normal temperature and normal humidity condition (23° C., 64%, which will hereinafter be called "N/N condition"). Under a high temperature and high humidity condition (32.5° C., 85%, which will hereinafter be called "H/H condition"), the resistance thereof is smaller by 1-2 orders than under N/N condition.

FIG. 11 shows the variation of the V-I characteristics depending on the difference in the ambient condition.

The solid lines represent the V-I characteristics under the L/L, N/N and H/H conditions when no transfer sheet is present at the transfer position, for example a pre-rotation period in which the photosensitive member is rotated before the image transfer operation in a first image formation, a post-rotation period in which the photosensitive member is rotated after the image transfer and after the image formation is completed, or the interval period between adjacent transfer operations when the image formation is performed successively. During this sheet absent period (absent at the transfer station or position), the photosensitive member passing through the transfer position has been charged by the charging roller 3 supplied with an AC voltage (peak-to-peak voltage of 1400 V) and a DC voltage of −700 V superposed thereto.

The broken lines represent the V-I characteristics of the transfer roller 2 under the same temperature and humidity conditions when the transfer material of A4 size is passing through the transfer position, wherein a longer side of the A4 side sheet is parallel with the transfer material conveying direction.

In such an apparatus, it has empirically been confirmed that the transfer current in the sheet present period (present at the transfer station or position) is 0.5–4 micro-ampere in order that the image transfer is good. If it is larger than 5 micro-ampere, a positive potential transfer memory remains in the region corresponding particularly to the sheet absent period in an OPC photosensitive member having a negative charging property, with the result that a foggy background is produced in the next image.

The transfer memory means a phenomena wherein when the photosensitive member (image bearing member) is excessively charged during the image transfer operation, the charge can not be removed by charge removing means such as pre-exposure means or the like, and therefore, the potential of the portion excessively charged becomes high in the next image forming operation, with the result that the next image involves the foggy background or non-uniform image density. The transfer memory tends to occur when the photosensitive member is an OPC photosensitive member.

Therefore, it has been found that the proper transfer bias is different depending on the ambient conditions, and it is approximately 300-500 V under the H/H condition, approximately 400-750 V under the N/N condition, and it is approximately 1250-2000 V under the L/L condition.

If a constant voltage control is effected to the transfer roller, the following problems arise.

If the transfer roller is constant-voltage-controlled at 500 V in an attempt to provide proper image transfer under the N/N condition, the similar image transfer is possible under the H/H condition. However, under the L/L condition, the transfer current is zero with the result of improper image transfer.

If the voltage is selected to improve the image transfer under the L/L condition, too much transfer current flows through the portion of the OPC photosensitive member corresponding to the sheet absent portion with the result of positive transfer memory, under the N/N and H/N conditions. Then, the resultant image contains foggy background. Particularly under the H/H condition, the transfer current increases during the sheet present period, and therefore, the electric charge penetrates through the transfer material to such an extent that the negatively charged toner on the surface of the photosensitive member is charged to the opposite polarity with the result of improper image transfer If a constant current control is effected to the transfer roller in an attempt to solve the problem, the following problems arise.

Generally, the apparatus of this type is capable of using smaller size of transfer materials than the maximum usable size. Therefore, when a small size transfer material is used, there is a portion where the sheet is not present and where the photosensitive member and the transfer roller are directly contacted, even during the sheet present period. In the apparatus described above, if the constant current control is performed with 1 micro-ampere, the current per unit area in the portion where the transfer roller is directly contacted to the photosensitive member is substantially equal to the current per unit area when the 1 micro-ampere is applied during the sheet absent period such as the pre-rotation period, the post-rotation period or the sheet interval period. Therefore, the voltage applied to the transfer roller is decreased so that hardly any current flows through the sheet present portion, as compared with the sheet absent region, with the result of improper image transfer.

In the above case, the transfer voltage decreases by more than 200 V under the H/H condition, less than 200 V under the N/N condition and approximately 400 V under the L/L condition when a letter envelope having a length of 70 mm measured along the direction of the axis of the transfer roller is passed, as compared with the case when A4 size sheet is passed. The current flowing through the transfer material is substantially zero with the result of improper image transfer.

If an attempt is made to provide sufficient image transfer even for the small size sheet, the current density flowing through a relatively narrow sheet absent portion such as the portion of the difference between the letter size sheet and the A4 size sheet, becomes large, and therefore, the foggy background is produced on the surface of the photosensitive member due to the transfer memory, and the backside of the next letter size sheet is contaminated.

Therefore, it has been difficult to provide an apparatus of this type wherein the good image transfer is effected to all sizes of the transfer material under all ambient conditions, either by the constant voltage control or by the constant current control.

SUMMARY OF THE INVENTION

Accordingly, it is a principal object of the present invention to provide an image forming apparatus wherein a stabilized good images can be provided under various conditions.

It is another object of the present invention to provide an image forming apparatus wherein good stabilized image transfer performance can be provided under various conditions and various sizes of the transfer materials.

It is a further object of the present invention to provide an image forming apparatus wherein the deterioration of the image due to the image transfer memory is prevented in an image bearing member such as a photosensitive member.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Figure 1:
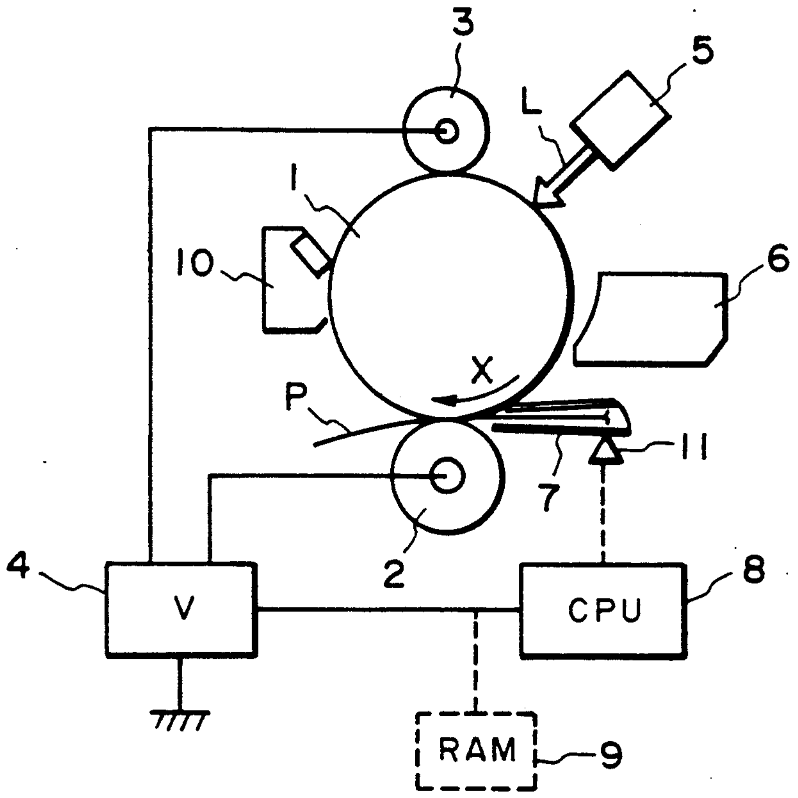
FIG. 1 is a sectional view of an image forming apparatus to which the present invention is suitably applicable.

Referring to FIG. 1, there is shown an image forming apparatus to which the present invention is conveniently applicable. An OPC photosensitive member 1 rotates in the direction of an arrow X at a process speed of 23 mm/sec. It has a diameter of 30 mm, and has a negative charging property. The surface thereof is uniformly charged by a charging roller 3 to a negative potential (−700 V). The charged surface is exposed to a laser beam L modulated in accordance with an image, by which the portions illuminated by the laser beam L is attenuated down to −100 V, so that an electrostatic latent image is formed. The charging means for the latent image formation may be a corona discharger rather than the charging roller 3.

With the rotation of the photosensitive member 1 after the latent image formation, the latent image reaches a developing device 6 biased by a developing bias of −370 V. By the developing device 6, negatively charged toner is supplied to the latent image, so that the toner is deposited on the portions which is exposed to light and which is attenuated in the potential, so that a toner image is formed through a reversal development.

Downstream of the developing device 6 with respect to the movement direction of the surface of the photosensitive member 1, an image transfer rotatable member in the form of a conductive transfer roller 2 is press-contacted to the photosensitive member 1 to form a nip therebetween which constitutes an image transfer station (transfer position).

When the toner image reaches the transfer station, an image transfer material P is supplied to the transfer station through a conveyance passage 7 in timed relation with the toner image, and the toner image is transferred from the surface of the photosensitive member 1 to the transfer material P by a positive transfer bias applied to the transfer roller 2 from a voltage source.

Between the transfer roller 2 and the photosensitive member 1, a clearance smaller than the thickness of the transfer material P may be provided. In this case, the transfer roller 2 is press-contacted to the photosensitive member 1 through the transfer material P only while the transfer material P is passing through the clearance. After the image transfer, the transfer material P is separated from the photosensitive member and is conveyed to an unshown image fixing device, which fixes the toner image on the transfer material P. On the other hand, the photosensitive member 1, after the image transfer, is cleaned by a cleaning device 10 so that the residual toner is removed, to be prepared for the next image formation.

The transfer roller 2 is electrically connected with a voltage source 4 capable of constant voltage control and constant current control (ATVC, Active Transfer Voltage Control) as disclosed in U.S. Ser. No. 428,932 which has been assigned to the assignee of the present application, so that the transfer roller 2 is supplied with a predetermined voltage at a predetermined time.

When a CPU (central processing unit) 8 receives a printing signal from an external apparatus such as a computer, the CPU 8 supplies a main motor driving signal to a motor driving circuit (not shown) for driving the photosensitive member 1, and simultaneously, it supplies a primary high voltage actuating signal to the voltage source 4 to apply a charging bias to the charging roller 3 to charge the surface of the photosensitive member 1 to a dark potential VD = −700 V. In this embodiment, the charging roller 3 is supplied with an AC voltage (peak-to-peak voltage of 1400 V) biased with a DC voltage (−700 V) for the above charging.

Then, the CPU 8 drives an image information writing means in the form of a laser scanner 5 to form an electrostatic latent image. Then, the latent image is developed with the toner, in the manner described above.

The CPU 8 supplies an image transfer actuating signal to the voltage source 4, upon which the constant voltage control and the constant current control are executed using the voltage source 4.

When the voltage source 4 receives the image transfer actuating signal, that is, the constant current transfer control (TCC) signal, it constant-current-controls the transfer roller 2 during at least a part of non-image period in which the toner image is not present on the photosensitive member at the transfer station, that is, during at least a part of the sheet absent period in which the transfer material is not present at the transfer station. Such periods exist, for example, during the warming up rotation period for the warming up of the fixing device, pre-rotation period before the start of the printing operation, and the sheet interval period from one sheet passing through the transfer station to the next sheet coming to the transfer station. In the apparatus shown, a constant current of 2 micro-ampere (positive) flows. The voltage V1 across the transfer roller 2 is stored at a time during the sheet absent period by a RAM 9 or a voltage holding circuit of the voltage source 4, for example. Upon the start of the image present period in which the photosensitive member has the image region at the transfer station, that is, the sheet present period in which the transfer material exist at least at the transfer station, the CPU 8 supplies a constant voltage transfer control (TVC) signal to the voltage source 4, so that the transfer roller is constant-voltage-controlled with a constant voltage V2 provided by multiplying the memorized voltage V1 by a coefficient R ($R>1$). By this, the toner image is transferred from the photosensitive member 1 to the transfer sheet of paper (transfer material). In this embodiment, when the voltage V1 is memorized, the constant voltage control by V2 is immediately performed. The voltage V1 varies slightly depending on the timing of the storing action, but the difference is not significant. The coefficient R ($R>1$) is properly determined by one skilled in the art in consideration of the transfer memory characteristics of the photosensitive drum 1, the uniformity of the resistance of the transfer roller or the like. As for the voltage V1, it may be determined as an average of plural sampled voltages during the constant current control, or it may be a one sampled voltage.

When the process speed is higher than the above, the transfer bias during the transfer operation is preferably increased in order to provide the good image transfer. In this case, for example, if the coefficient R is equal to or smaller than 1, the voltage V1 appearing during the constant current control across the transfer roller 2 becomes larger than the voltage V2 during the constant voltage control, and therefore, the current flowing through the transfer roller 2 during the constant current control becomes larger than the necessary level.

Therefore, by limiting the coefficient R to be larger than 1, the current flowing through the transfer roller 2 which is constant-current-controlled during the period in which the transfer material is not present at the transfer station can be made small, so that the load of the high voltage source can be reduced. In addition, even for the photosensitive member which is easy to produce the transfer memory or for a transfer roller having non-uniform resistance along the circumferential direction thereof (the non-uniformity may occur due to unavoidable manufacturing error), the current flowing during the non-transfer period (sheet absent period) can be reduced, whereby the transfer memory can be prevented. Even if the resistance varies in the circumferential direction of the transfer roller slightly, a high transfer bias can be applied only during the transfer operation, and therefore, a larger latitude can be provided for the material.

In this embodiment, the coefficient R is 1.5.

Figure 2:
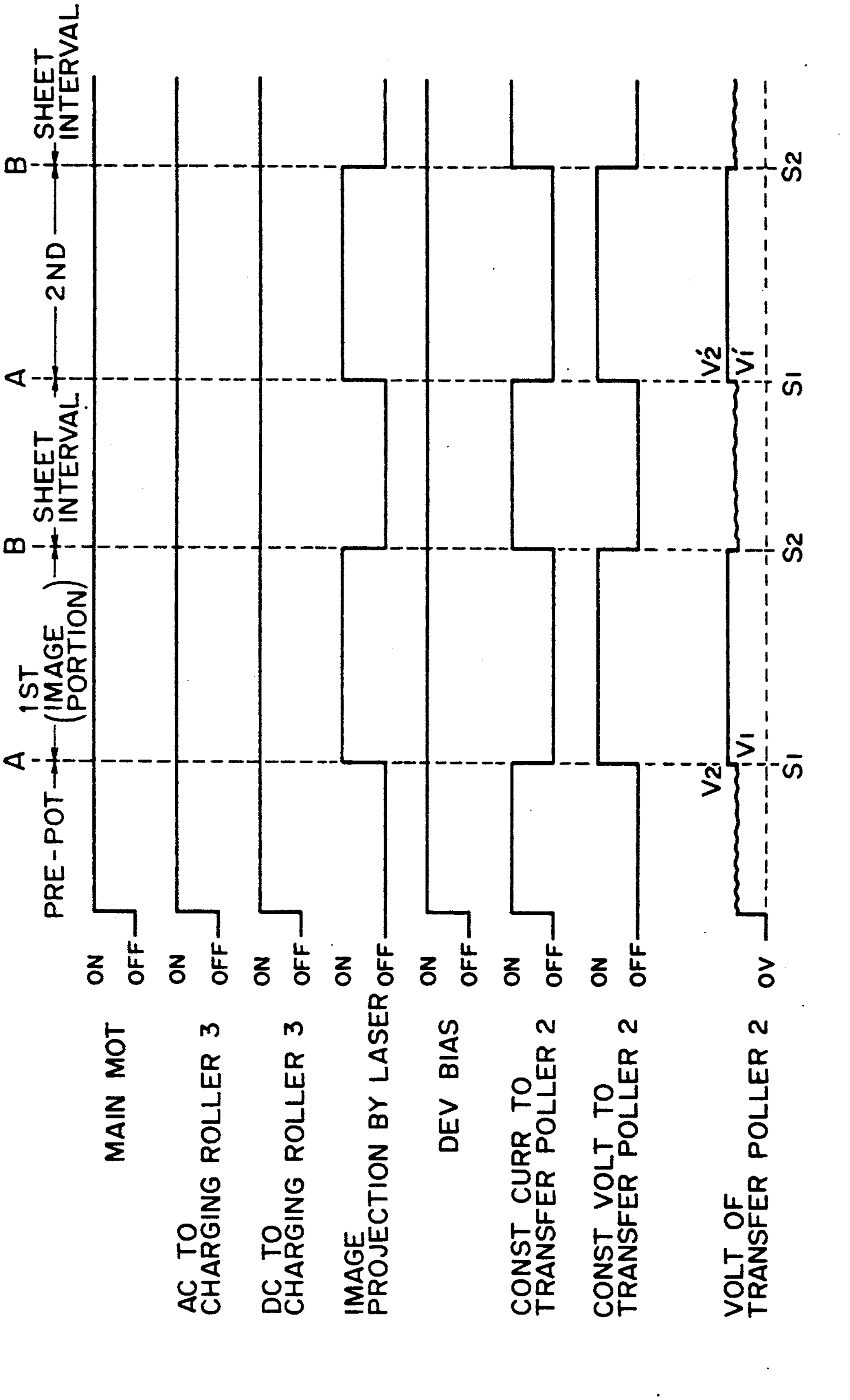
FIG. 2 is a time chart illustrating sequential operation of the apparatus of FIG. 1.

FIG. 2 is a time chart showing the sequential operations of the apparatus described above.

Figure 3:
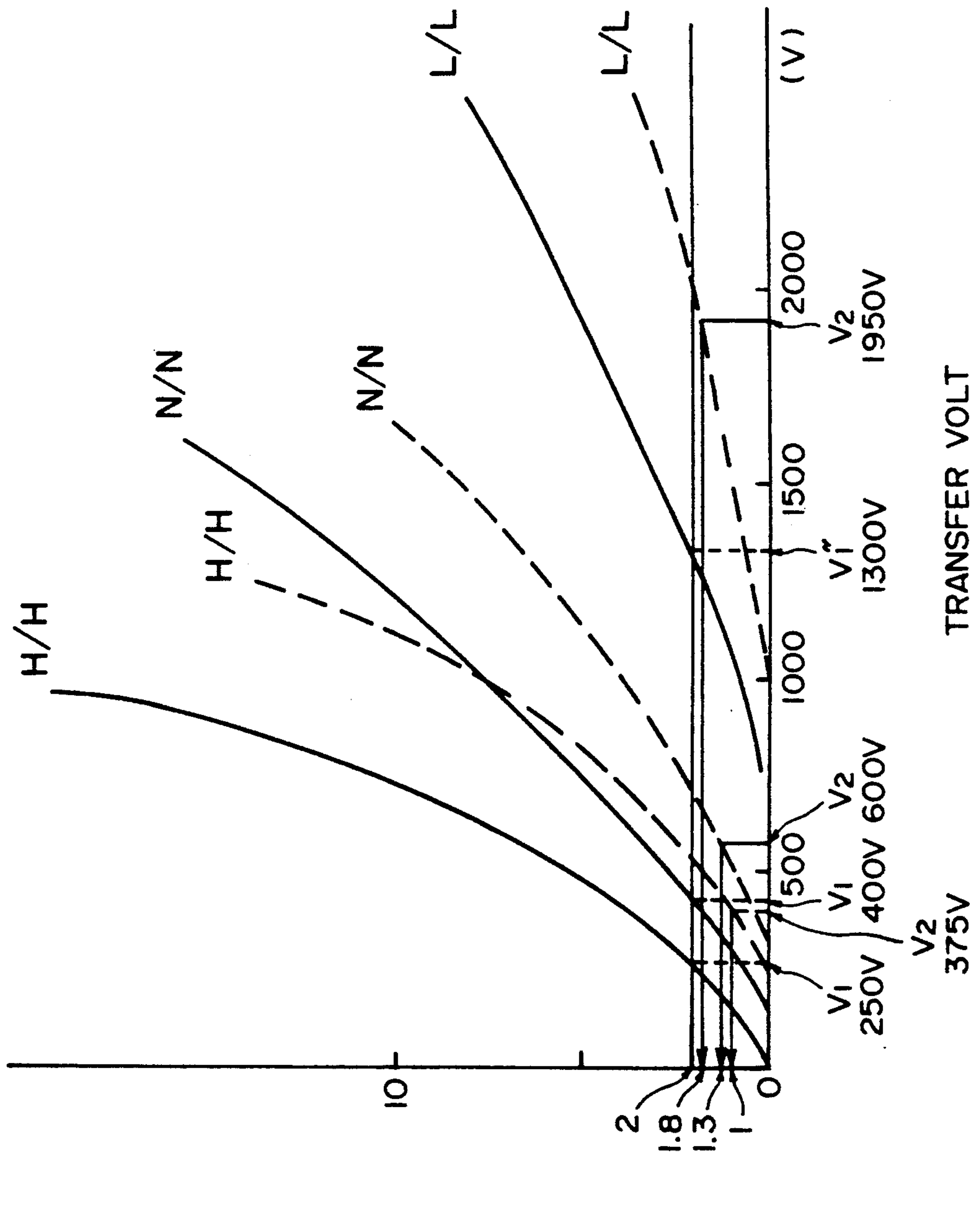
FIGS. 3, 11, 15, 16, 18, 19 and 20 are graphs showing the V-I characteristics of the transfer means under a low temperature and low humidity condition (L/L), a normal temperature and normal humidity condition (N/N) and high temperature and high humidity condition (H/H).

Referring to FIG. 3, the behavior of the apparatus of this embodiment will be described under various conditions. FIG. 3 shows the V-I characteristics same as that of the transfer roller 2 shown in FIG. 11.

The V-I characteristics of FIG. 3 were obtained when the transfer roller was made of conductive material (steel) and EPDM having a thickness of 5 mm applied thereon and having a diameter of 16.6 mm. The resistance of the transfer roller was $10$–$10^9$ ohm under the L/L condition, $10^7$–$10^8$ ohm under the N/N condition, and $10^6$–$10^7$ ohm under the H/H condition. The V-I characteristics may be different if the property of the material of the transfer roller is different.

Under the H/H ambient condition, the constant current control (2 micro-ampere) is effected to the transfer roller 2 by the voltage source 4 during the sheet absent period (when the image transfer operation is not performed). Then, the voltage across the transfer roller is 250 V. The voltage is stored as the voltage V1 by a voltage holding circuit. During the sheet present period, the transfer roller is subjected to the constant voltage control with the voltage V2 (=375 V) obtained by multiplying V1 by 1.5. By doing so, the transfer current of 1 micro-ampere can be provided for all sizes of the transfer material, as shown in FIG. 3, and therefore, the image transfer operation is satisfactory.

In the constant current control period during which the transfer material is not present at the transfer station, only the current of 2 micro-amperes which is smaller than 5 micro-amperes is flown, and therefore, even if the variation in the resistance in the circumferential of the transfer roller is considered, the foggy background due to the positive transfer memory is not produced. In addition, the deterioration of the photosensitive drum 1 due to the charging is small, and the service life of the photosensitive drum is increased. Furthermore, the portion of the photosensitive drum where a large size sheet passes, but a small size sheet does not pass, that is, the portion corresponding to the difference between the large size sheet and the small size sheet, the current density can be prevented from exceeding 5 micro-amperes by properly selecting the coefficient R, and therefore, the transfer memory does not remain in the photosensitive member.

The same applies to the other ambient conditions, that is, N/N condition and L/L condition.

Under the N/N ambient condition, the constant current control is effected with 2 micro-ampere to the transfer roller 2 during the sheet absent period. At this time, the voltage across the transfer roller 2 is approximately 400 V. The voltage is stored, and during the subsequent sheet present period, the constant voltage control is effected with 600 V (=1.5×400 V) to the transfer roller 2. By this, the sheet present period, the transfer current is approximately 1.3 micro-ampere, and therefore, the good image transfer can be assured.

Under the L/L condition, if the same constant current control as with the above cases, during the sheet absent period, the voltage across the transfer roller 2 is 1300 V, and therefore, the constant voltage control with 1950 V is effected to the transfer roller 2 during the sheet present period. At this time, the transfer current through the transfer roller 2 is approximately 1.8 micro-amperes, so that good image transfer can be performed. If the constant voltage control of 1950 V is effected to the transfer roller during the sheet present period with the coefficient R=1, the constant current during the sheet absent period has to be not less than 5 micro-amperes. Therefore, in this case, the foggy background due to the transfer memory is produced.

As described in the foregoing, according to the present invention, good image transfer operation is assured at all times irrespective of the ambient conditions and the size of the transfer materials as in the invention disclosed in the U.S. Application mentioned hereinbefore (ATVC control). In addition, during the constant current control period in the period in which the transfer material is absent at the transfer station, the current is significantly smaller than the current producing the foggy background due to the transfer memory, and therefore, even if the electric properties such as resistance of the photosensitive member or the transfer roller varies, the foggy background due to the transfer memory is not produced, so that the image quality can be maintained. In addition, only small current is flown during the constant current control, and therefore, the deterioration by the charging of the photosensitive member is small, so that the service life of the photosensitive drum can be increased.

Furthermore, by properly selecting the coefficient R, the latitude in use of the photosensitive member and the transfer roller can be expanded, and therefore, the load of the high pressure can be reduced even for the high process speed apparatus. For example, even for a high speed apparatus having a process speed of 230 mm/sec which is 10 times the foregoing embodiment, if the coefficient R is 1, 40 micro-amperes of the constant current is required during the transfer material absent period at the transfer station if the transfer current of 40 micro-amperes is required during the sheet present period, for example. If, however, by selecting the coefficient R to be 1.5, 20 micro-ampere of the constant current which is far less than 50 micro-amperes producing the transfer memory can be used similarly to the foregoing embodiment, during the transfer material absent period.

Figure 4:
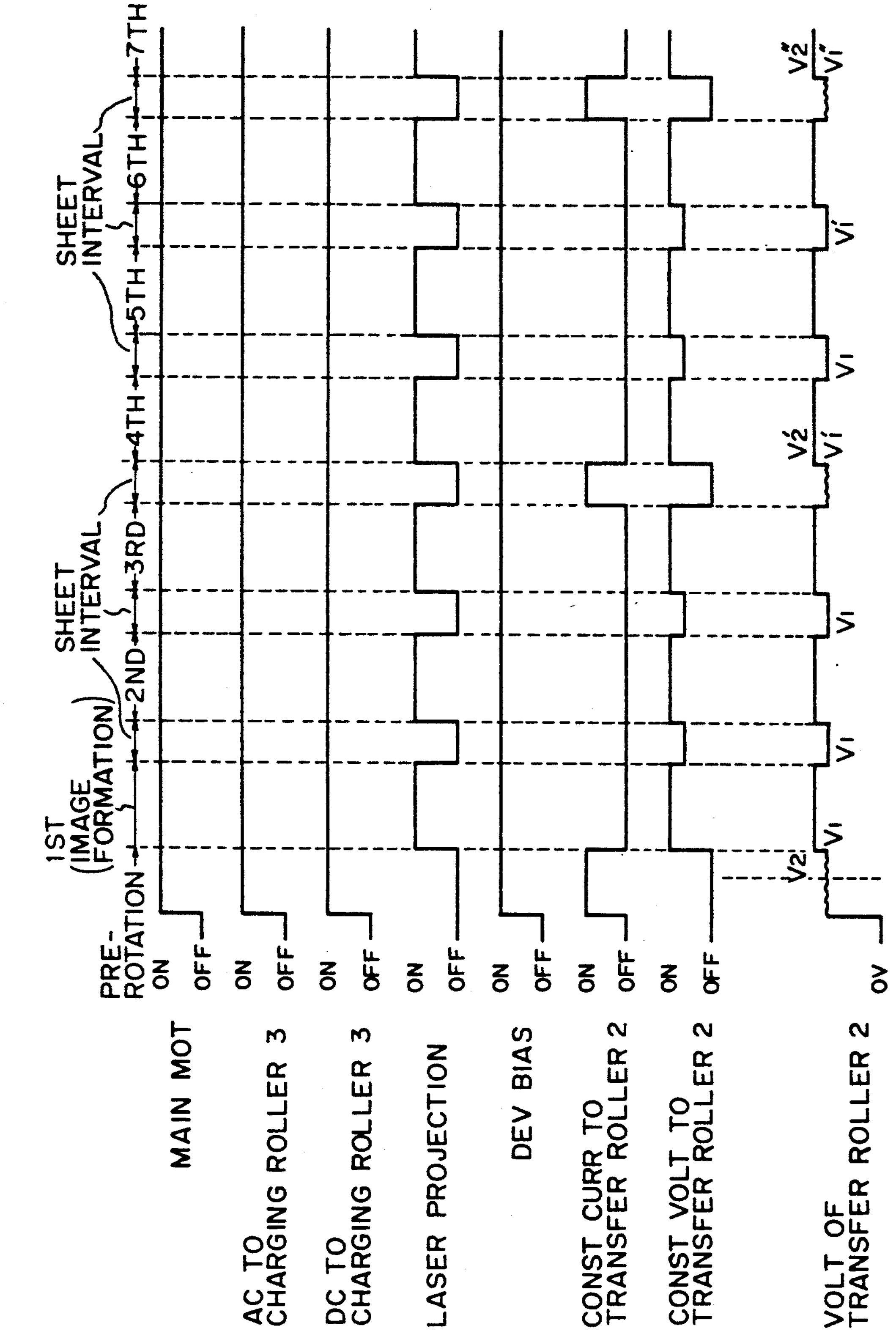
FIGS. 4, 5, 6, 8, 12, 13, 14 and 21 are time charts illustrating other sequential operations.

FIG. 4 shows a sequential operation in another embodiment.

In this embodiment, when one page is to be printed, the ATVC control described in the foregoing embodiment is performed. However, when the images are continuously printed on plural transfer materials in response to one image start signal, the constant current control is performed for every three transfer materials, as shown in FIG. 4, and the voltage V1 is stored. During the sheet intervals in which the constant current control is not performed, the constant voltage control is carried out with the voltage level of V1.

It has been confirmed that the good images can be provided under all the conditions as in the foregoing embodiment.

The constant current control for every three sheets are not limiting to the present invention.

Figure 5:
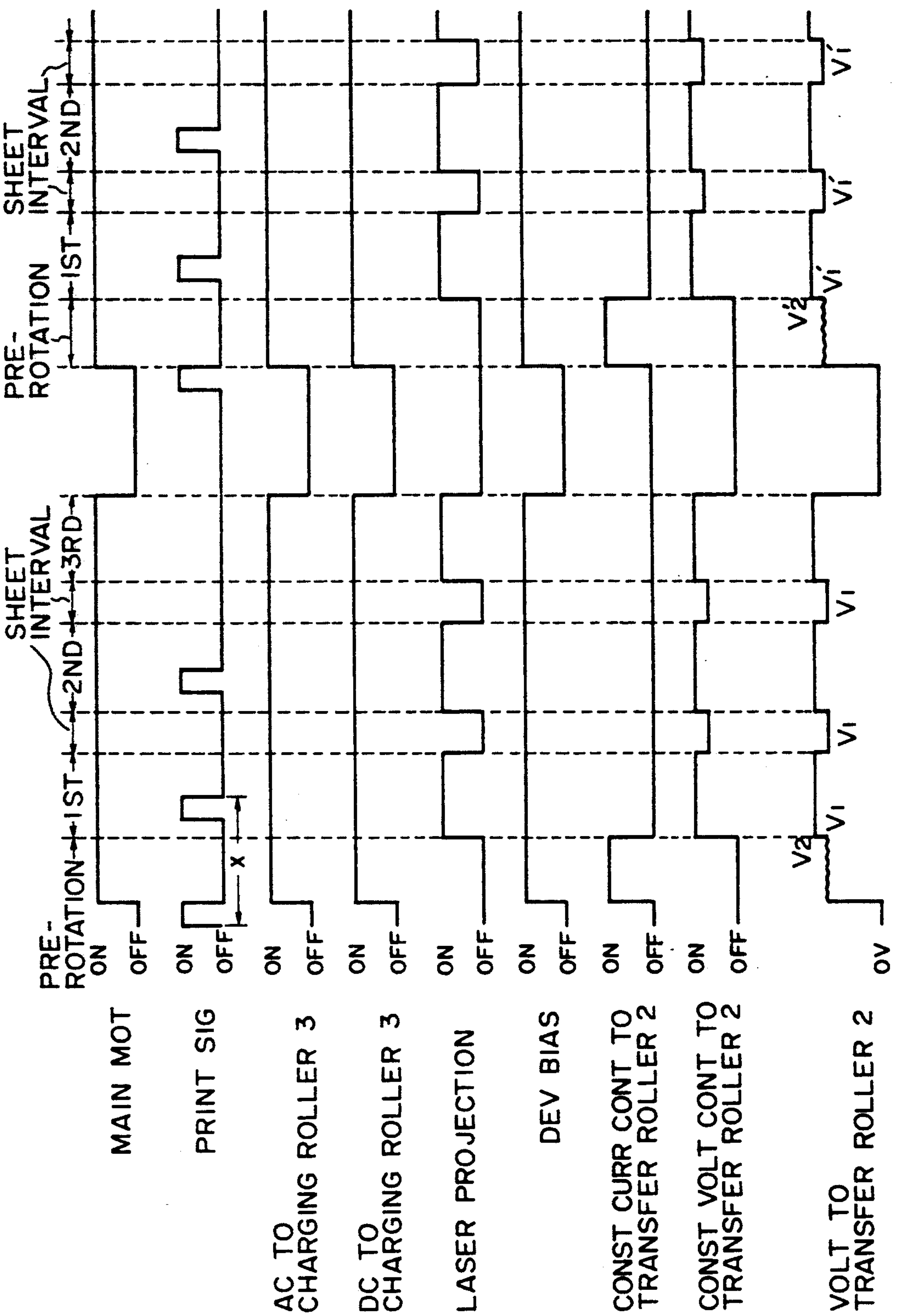

FIG. 5 shows a further embodiment wherein the ATVC control according to this invention is incorporated in an image forming apparatus wherein a latent image or the like is formed on an image bearing member in accordance with image signals corresponding to image information, such as a laser beam printer, LED printer, LSC printer.

In this embodiment, in the case where a predetermined period (x in the Figure) after input of the printing signal to the CPU 8, the printing signal is introduced again, the voltage held by the ATVC control during the previous print signal is maintained, and the constant voltage control is effected to the image output for the printing inputted in the later stage. In this manner, when the print signal is inputted, the ATVC control according to this invention is not performed to the new signal, but the constant voltage control for the first signal is continued.

When the next printing signal is not produced during the time period x, the ATVC control according to this invention is executed at the time of the input of the next signal.

With this structure, the same advantages as in the foregoing can be provided. This is particularly advantageous when the ambient condition does not change during one job so that the V-I characteristics do not change. The ATVC control is effected only during the pre-rotation period in which the image bearing member rotates before the image is formed on the image bearing member.

Figure 6:
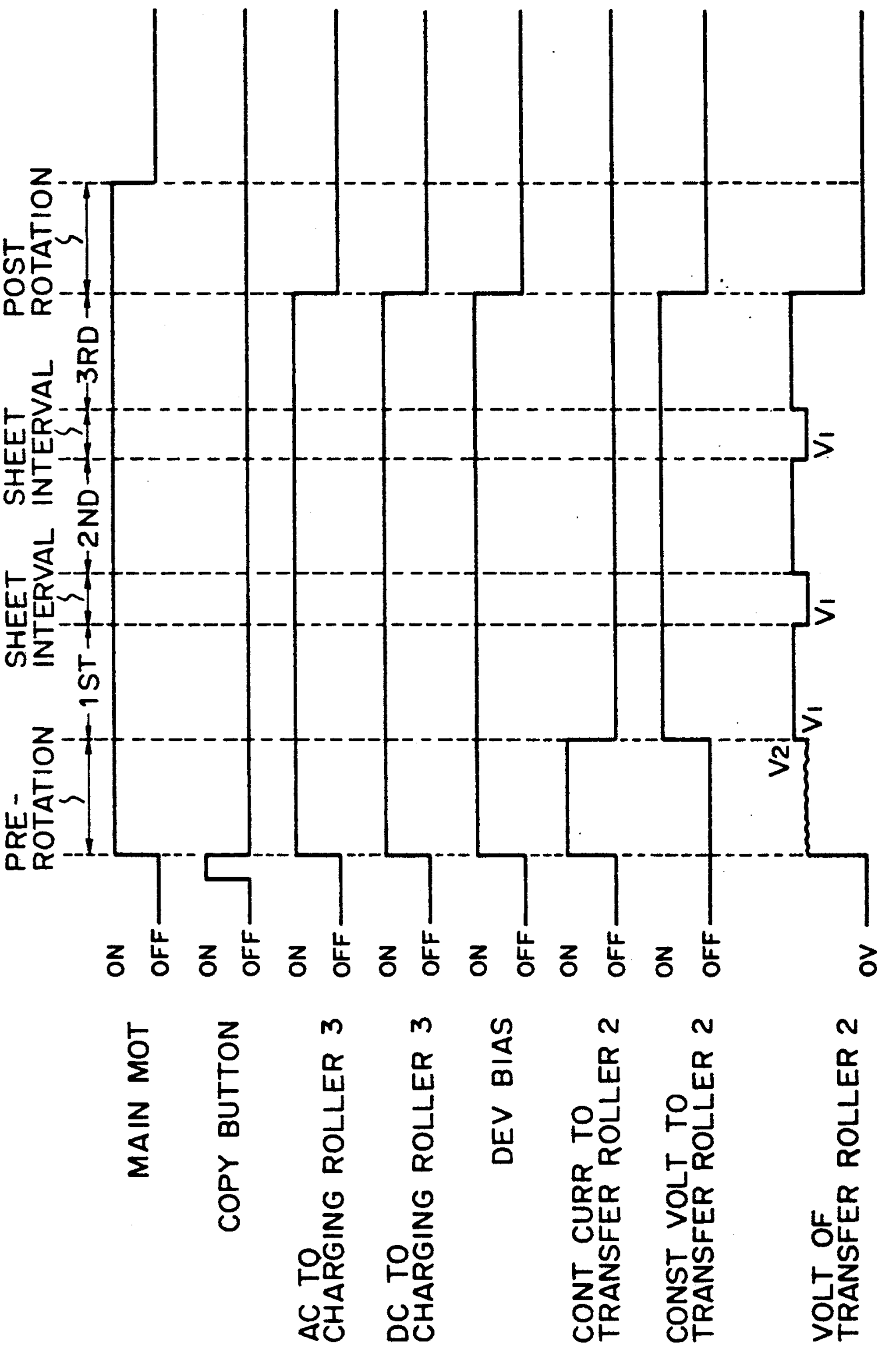

FIG. 6 shows a further embodiment wherein the ATVC control according to this invention is incorporated in a copying machine.

In this case, when the apparatus performs the pre-rotation after the image formation start signal is introduced by depressing the copy button, the ATVC control according to this invention is performed, and thereafter, the constant voltage control is performed during the subsequent copying operation. The Figure shows the control state after three copies are produced.

In the states described above, the region of the photosensitive member which is in the transfer station when the transfer roller 2 is constant-current-controlled has been electrically charged by the charging roller 3 which is supplied with AC and DC voltages. However, such a region of the photosensitive member may not be charged by stopping the application of the voltage to the transfer roller 3.

Figure 7:
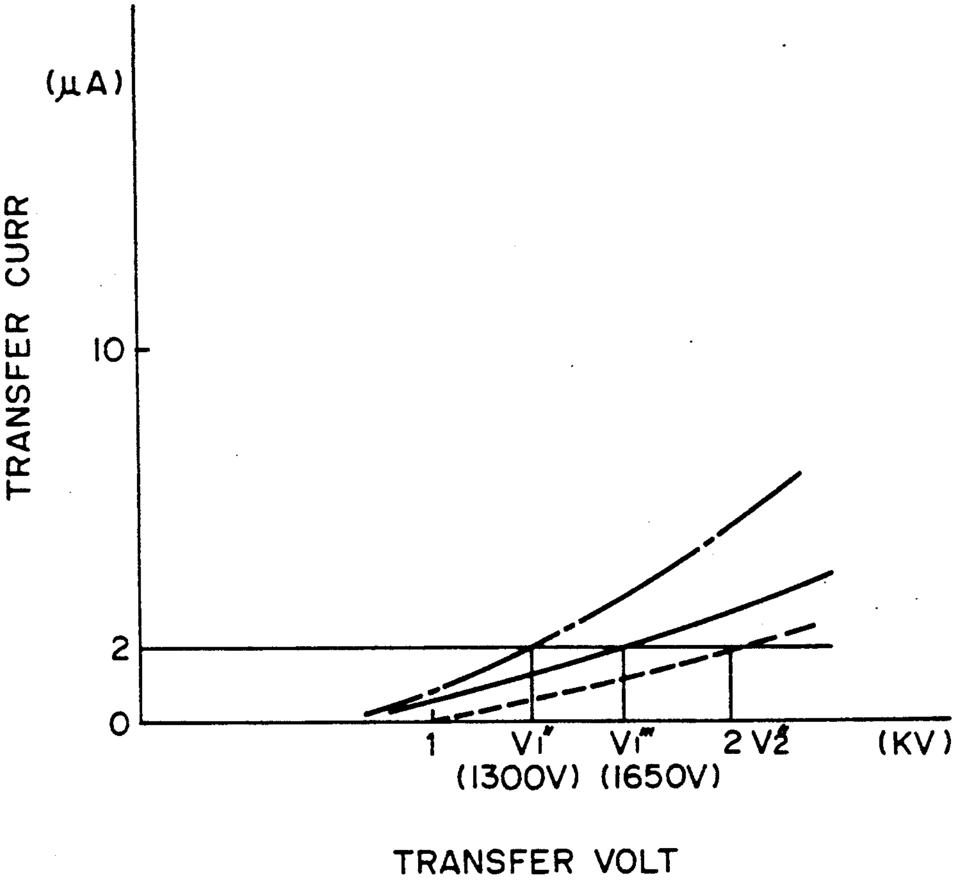
FIG. 7 is a graph showing the V-I characteristics of the transfer means when the state of electric charge is different on the image bearing member.

Referring to FIG. 7, this will be described. The solid line in FIG. 7 represents the V-I characteristics of the transfer roller 2 in the case where the region of the photosensitive member not charged is formed by stopping the application of AC and DC voltages to the charging roller 3, and the transfer material is not present at the transfer station when the non-charged region of the photosensitive member is passing through the transfer station. The broken line and the chain line represent the V-I characteristics of the transfer roller 2 in the case where the charged region on the photosensitive member is formed by applying both of AC and DC voltage components to the charging roller 3, and the transfer material is present and absent, respectively, at the transfer station when the charged region passing through the transfer station.

Here, the transfer roller 2 is the same transfer roller as used in the foregoing embodiment. FIG. 7 shows the V-I characteristics of the transfer roller 2 under the L/L condition. Similarly to the foregoing embodiment, the charging properties of the charging roller and the transfer roller are opposite.

As will be apparent from FIG. 7, when both of the AC and DC voltage components are rendered off to the charging roller 3, the transfer current decreases as compared with the case wherein they are on, provided that the applied voltage is the same. The reason for this is that the transfer current is dependent on the potential difference between the surface of the photosensitive member and the core metal of the transfer roller to which the voltage is applied.

Figure 8:
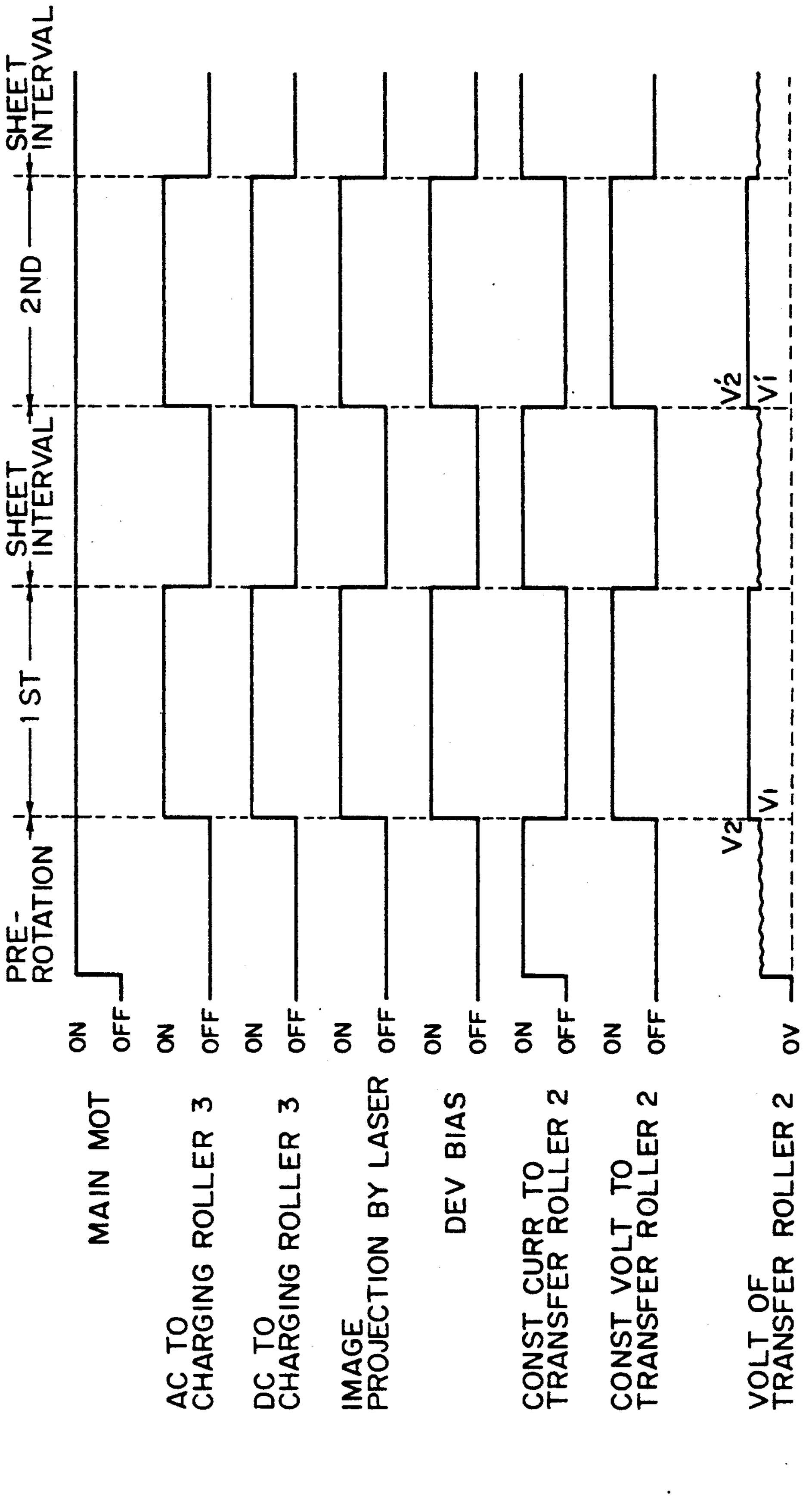
Figure 9:
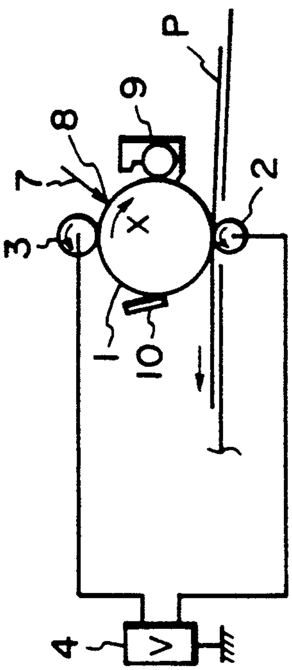
FIG. 9 is a sectional view of a conventional image forming apparatus.
Figure 10:
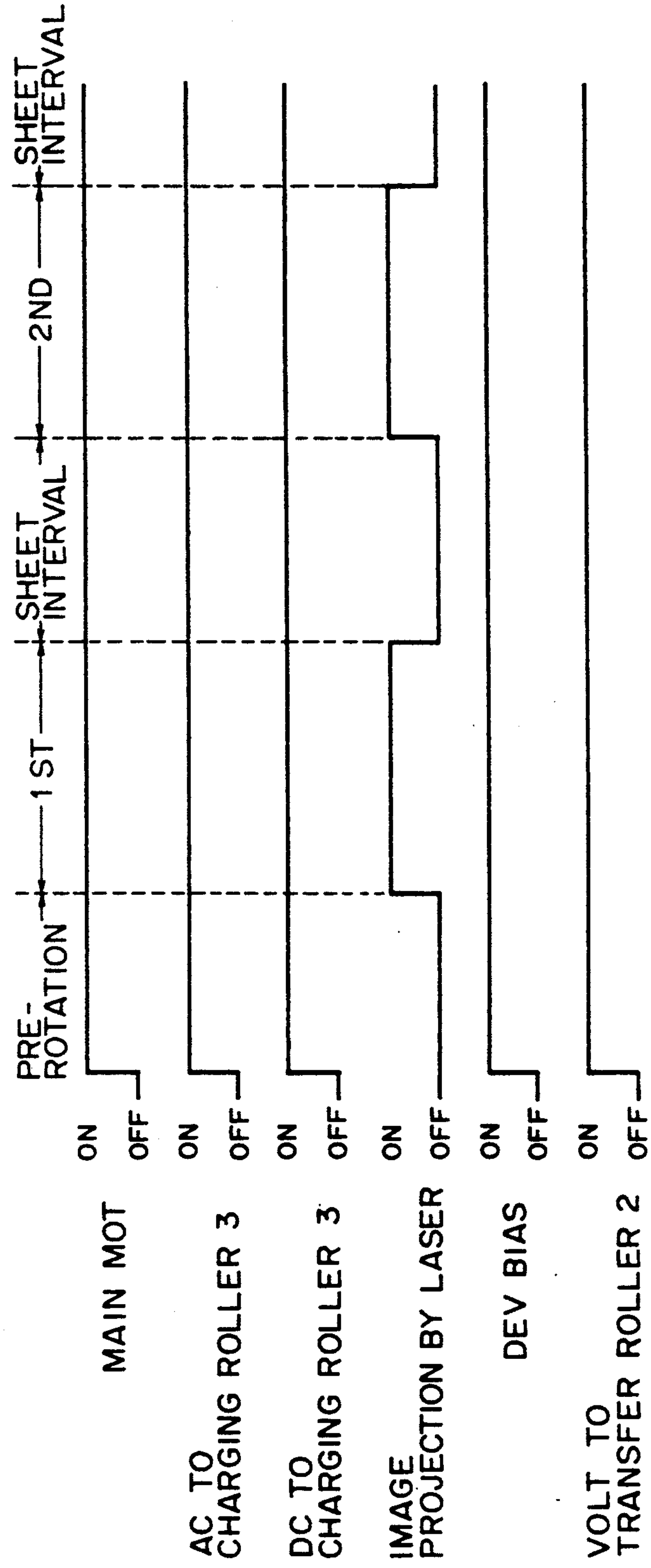
FIG. 10 is a time chart showing the sequential operation of the apparatus of FIG. 10.

In FIG. 7, if the same constant current control as in FIG. 2 is executed during the sheet intervals period, the voltage V1" is 1300 V when both of the AC and DC component voltages are applied to the charging roller 3. The voltage V2" is 1950 V (1.5×1300). When the charging roller 3 is not supplied with either of the AC and DC component voltages, the voltage V1‴ is 1650 V, and the voltage V2‴ is 1980 V (1.2×1650 V) which is close to the above voltage V". Therefore, the present embodiment involves the similar advantageous effect as in the foregoing embodiment. In addition, the coefficient R can be reduced. The operational sequence of the apparatus in this embodiment is shown in FIG. 8. As contrasted to the foregoing embodiment, in the state wherein the charging is not performed in the non-image-region of the photosensitive member, the developing bias is not supplied so as not to develop such a region.

In this embodiment, the constant current control to the transfer roller may be effected during at least a part of the period in which the transfer material is not present in the transfer station.

On the other hand, when the constant current control of the transfer roller and the constant voltage control of the transfer roller are switched at the leading edge and the trailing edge of the transfer material in the timing shown in FIG. 2, the following problems arise.

In the machines produced in mass-production system, it is difficult that the leading edge (A, in FIG. 2) of the transfer material is coincident with the point of time (S1, FIG. 2) of switching from the constant current control to the constant voltage control (V2), and that the trailing edge of the transfer material (B, FIG. 2) is coincident with the switching point (S2, FIG. 2) from the constant voltage control (V2) to the constant current control.

If the point S1 is upstream (left side in FIG. 2) of the point A, and the point S2 is downstream (right side in FIG. 5) of the point B, the voltage V2 which is to be applied during the sheet present period is applied to the transfer material during the sheet absent period as the constant voltage. Therefore, the photosensitive member is directly charged not through the transfer material to an excessive extent. The excessive charging of the photosensitive member results in charge memory in the photosensitive member, and it is not easily discharged. When the photosensitive member is repeatedly used, the image non-uniformity is produced in the next image formation at the charge memory region. This is particularly remarkable when the OPC photosensitive member having the charging polarity described above is used, and the reverse development is effected wherein the bias voltage applied to the transfer roller has the polarity opposite to the charging polarity.

On the other hand, when the point S1 is downstream of the point A, or when the point S2 is upstream of the point B, the constant current control is effected to during the sheet present period. Therefore, the intended structure is disturbed with the result that the voltage V1 becomes excessively high, and therefore, that the voltage V2 is also excessively high, so that proper image transfer operation can not be performed.

In consideration of the above, the switching between the constant current control and the constant voltage control to the transfer roller is performed in the following manner. In the following description, the portion which is the same as the foregoing embodiment is not described.

Similarly to the foregoing embodiment, when the voltage source 4 receives the TCC control signal from the CPU 8 during the transfer material absent period at the transfer station, the transfer roller 2 is subjected to the constant current control (2 micro-amperes) when the transfer material is fed to the transfer station, the voltage source 4 receives the TVC (1) signal for the first constant voltage control at a point 5 mm upstream of the leading edge of the first transfer material (transfer material absent region), upon which the constant current control is stopped, and the constant voltage control is effected to the transfer roller with the voltage V1 which is produced during the constant current control and which is stored.

Figure 12:
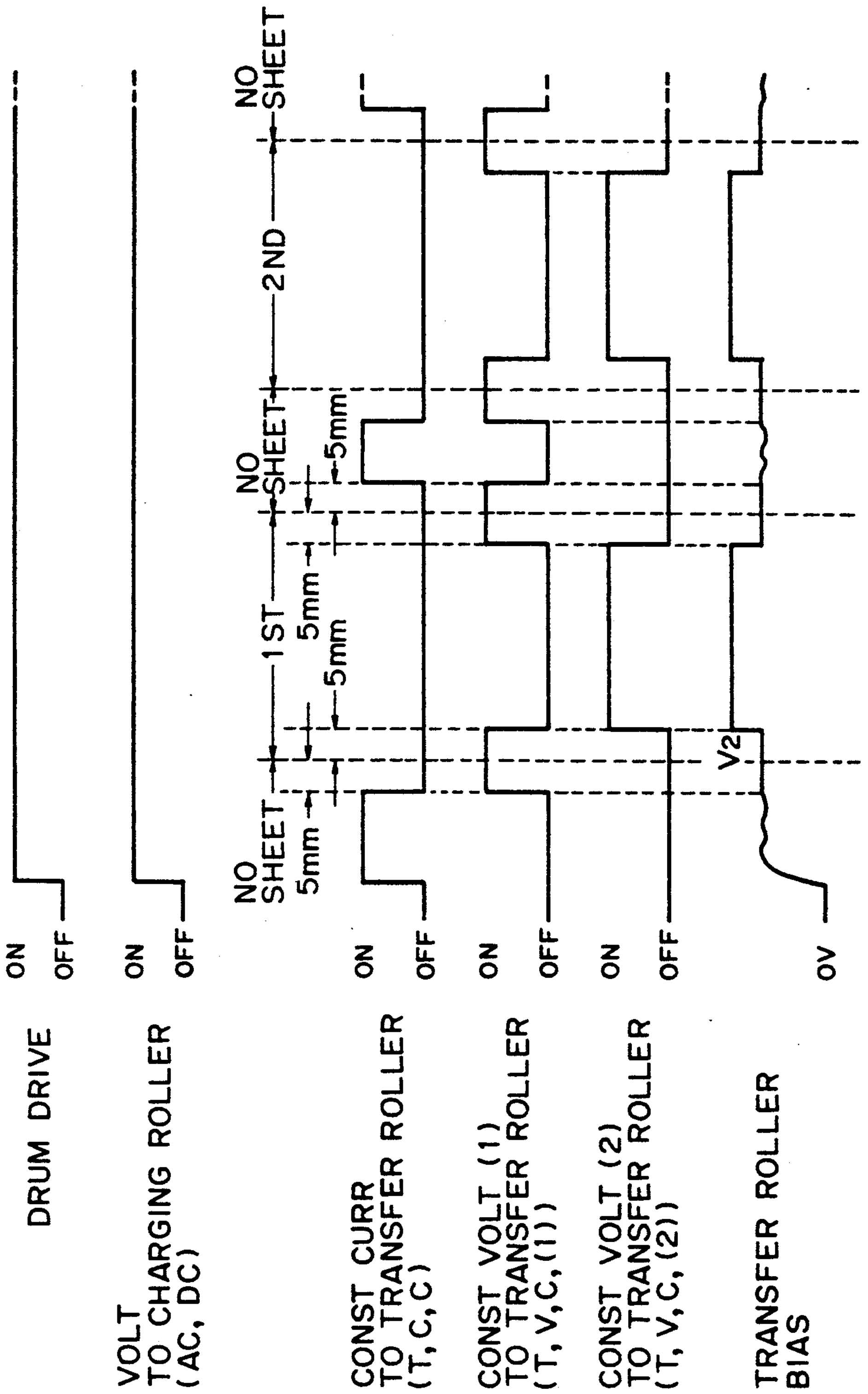

This timing can be obtained by disposing a sensor 11 for detecting the transfer material in the sheet conveyance passage upstream of the transfer station, as shown in FIG. 1, and by transmitting the signal from the sensor 11 to the CPU 8. The sensor 11 can detect the leading and trailing edges of the transfer material and supplies the detection signals to the CPU 8. The voltage source 4 receives a TVC (2) signal for the second constant voltage control when a position of the transfer material which is 5 mm away from the leading edge of the first transfer material is passing through the transfer station (transfer material present region), and the constant voltage control is effected to the transfer roller 2 with the voltage V2 obtained by multiplying the stored voltage V1 by the coefficient R (R>1). In this embodiment the coefficient R is 1.5. Then, the voltage source 4 receives the TVC (1) signal when the position of the first transfer material away from the trailing edge by 5 mm passes the transfer station, the constant voltage control with the stored voltage V1 is performed, again. The voltage source 4 again receives the TCC signal when a point 5 mm downstream of the trailing edge of the first transfer material (transfer material absent region) is passing through the transfer station, the constant current control with the 2 micro-ampere is performed again. Thereafter, the above-described sequential operation is repeated for the second and subsequent sheets. The sequential operation in this embodiment and the bias voltage applied to the transfer roller are shown in FIG. 12.

In this embodiment, the constant voltage control with the voltage level V1 which is the voltage level produced in the constant current control is always effected in the boundary region at the leading and trailing edges of the transfer material in the transfer station in the region where the image transfer operation is substantially effected to the transfer material, that is, the region from the point 5 mm downstream of the transfer material leading edge to the point 5 mm upstream of the trailing edge, the constant voltage control with the voltage V2 which is the voltage V1 multiplies by the coefficient R (=1.5) is carried out. In the transfer material absent period, no voltage higher than the voltage V1 during the constant current control period is not applied.

Accordingly, the image transfer is good on the entire area of the transfer material, and in addition, during the transfer material absent period, the transfer drum 1 is not directly charged to an excessive extent, so that the charging memory or the deterioration by the charging can be prevented. The sequential operation for controlling the bias voltage applied to the transfer roller is easier for the mass-production. Here, the charging memory is a phenomenon wherein when the photosensitive drum (image bearing member) is excessively charged, the charge can not be removed by the pre-exposure step or the like with the result that the potential of the excessively charged portion becomes high in the next image formation, so that image density in the next image becomes non-uniform.

Figure 13:
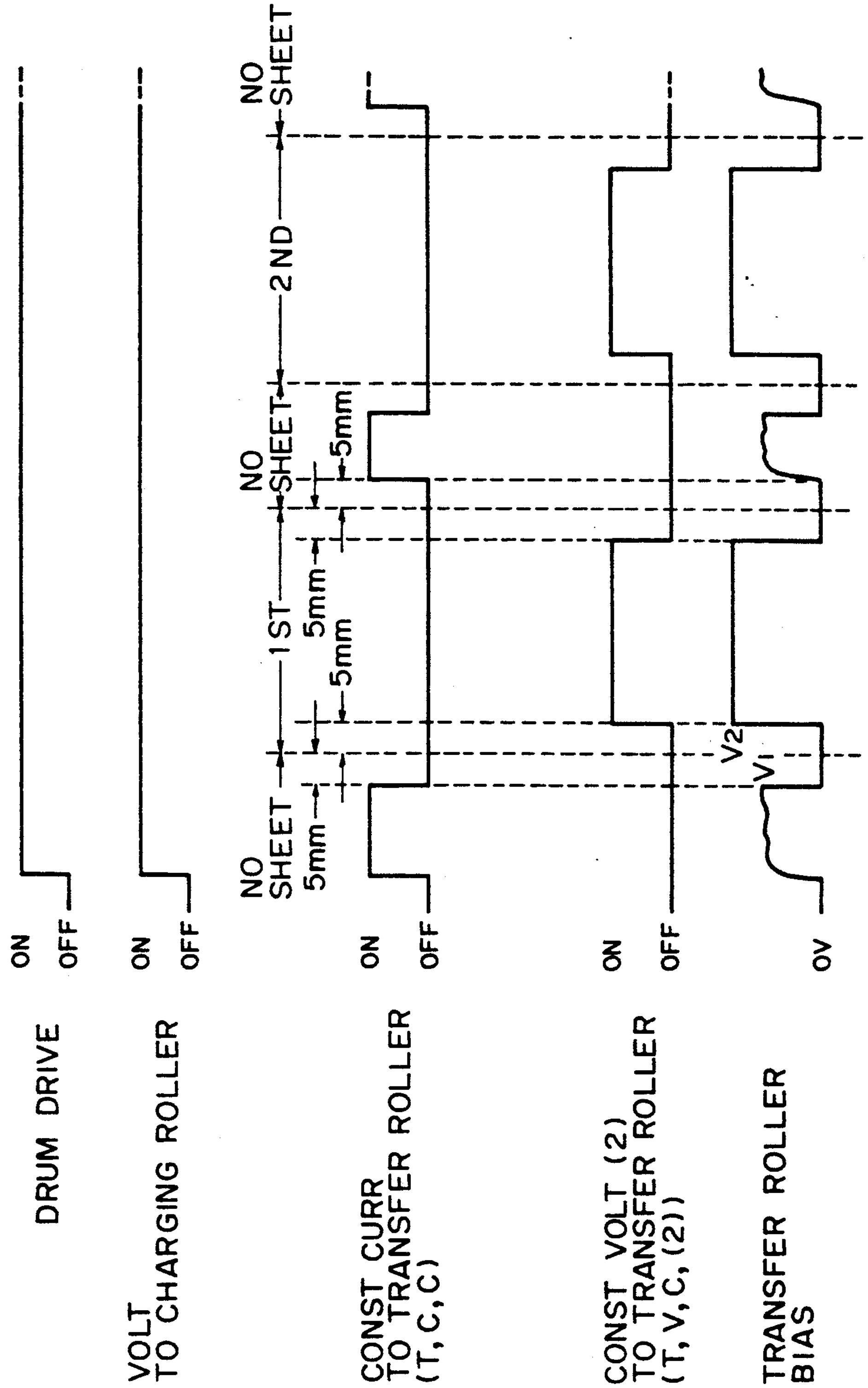

In the foregoing embodiment, in the boundary area adjacent the leading edge or the trailing edge of the transfer material, the voltage of the constant voltage control is V1 which have appeared during the constant current control, but the voltage is not limited to V1, but may be a voltage lower than the voltage V1. For example, by selecting 0 V, that is, by not applying the bias voltage, the sequence and the voltage applied to the transfer roller are as shown in FIG. 13.

Figure 14:
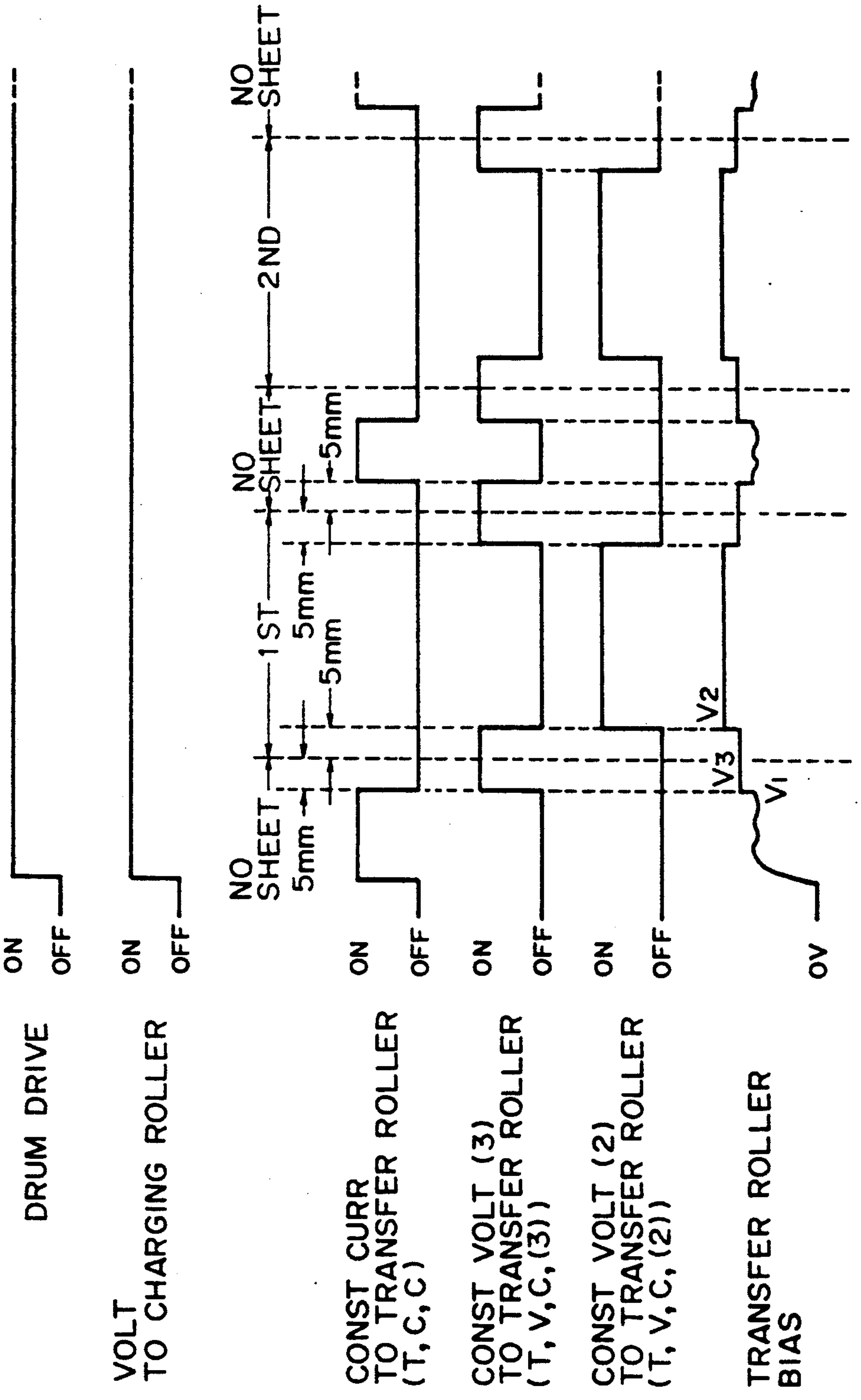

On the other hand, in the case where the charging memory due to the image transfer does not occur in the photosensitive drum even if the bias voltage applied to the transfer roller in the boundary region is higher than the voltage V1 during the constant current control, the bias voltage applied to the transfer roller in the boundary region may be V3 which is V1 multiplied by 1.2, wherein the bias voltage during the image transfer is V2 which is V1 multiplied by 1.5. This is the case wherein the charging memory occurs when the bias voltage applied to the transfer material absent period is V2, but it does not occur if it is V3. The sequence and the bias applied to the transfer roller in this case are shown in FIG. 14. According to this example, in an image forming apparatus having a high process speed (the rotational speed of the photosensitive drum, when the voltage rising period from the voltage V1 to the voltage V2 is not negligible with the result that the boundary area adjacent to the leading and trailing edge of the transfer material are substantially very long, the response of the voltage switching is better by selecting the voltage V3 which is between the voltages V1 and V2 for the boundary region.

In the foregoing example, the boundary regions are 5 mm respectively upstream and downstream of the leading and trailing edges. The length is not limited to this. If the accuracy of the position detection of the leading and trailing edge of the transfer materials in increased, the length may be shortened.

A further embodiment of the present invention will be described. The description of the portions which are the same as the foregoing embodiments are omitted for the sake of simplicity.

In the apparatus of this embodiment, the voltage source 8 performs the constant current control to the transfer roller 2 when the transfer material is not present at the transfer station, such as when the image fixing device is being warmed up, when the image bearing member is pre-rotated before the start of the printing operation and when the transfer material is absent between the continuously supplied transfer materials. The voltage across the transfer roller 2 at this time is stored, and the constant current control is stopped. During the transfer material present period, that is, when the transfer material is present at the transfer station, the voltage obtained by multiplying the stored voltage by the coefficient R (R>1) is constantly applied to the transfer roller 2 (constant voltage control). The coefficient is changed depending on the ambient conditions. In this embodiment, the electric properties of the transfer roller are different from the transfer roller in the foregoing embodiments.

Figure 15:
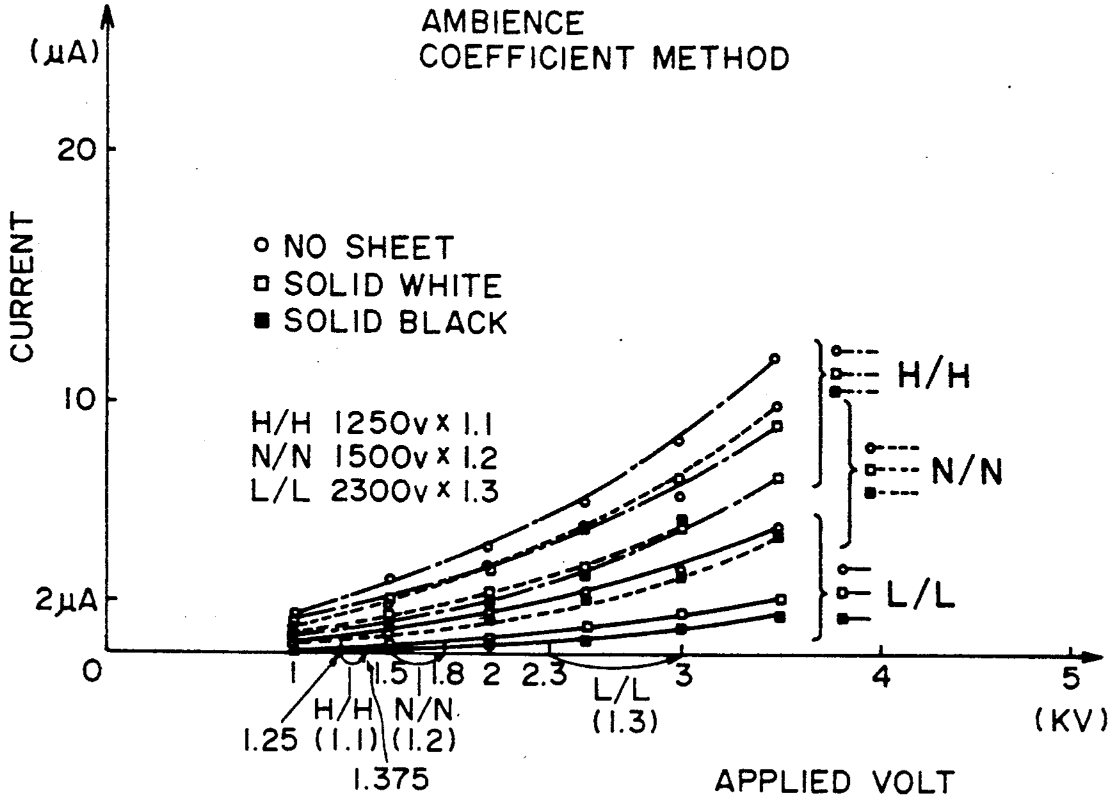

FIG. 15 shows a relationship (V-I characteristics) between the voltage applied to the transfer roller and the current flowing through the roller, when the ambient condition is different. First, the N/N condition will be described. During the transfer material absent period, the potential of the photosensitive member $V_D$ is −600 V. The constant current during the constant current control is 2 micro-ampere. The voltage applied across the roller 2 is approximately 1500 V. The current required for transferring a solid black image is approximately 0.5 micro-ampere with the voltage of approximately 1500 V. However, in order to output the stabilized solid black image, approximately 1 micro-ampere transfer current is required. Therefore, the stored voltage (approximately 1500 V) is multiplied by 1.2, and the multiplied voltage (1800 V) is applied to the transfer roller, so as to provide the solid black transfer current of 1 micro-ampere. By controlling the voltage and current of the transfer roller in this manner, the transfer roller is constant-voltage-controlled at approximately 1800 V curing the sheet present period. At this time, the solid black transfer current is approximately 1 micro-ampere, with which good image transfer operation can be performed.

This is the case where the A4 size transfer material is used. Even if the size of the transfer material is smaller, the same advantageous effects can be provided, since the constant voltage control is effected.

The foregoing is considered under the different ambient conditions, that is, H/H and L/L conditions.

When the transfer roller which is the same as the above case (N/N condition), the voltage applied to the roller is approximately 1250 V under the H/H condition when the current flowing through the transfer roller during the sheet absent period is 2 micro-ampere (constant current control). The voltage is stored, and the constant voltage control is effected by approximately 1375 V which is obtained by multiplying the stored voltage by 1.1. Then, the current of 1 micro-ampere flows through the roller during the sheet present period, for the solid black image.

Under the L/L condition, if the constant current control during the sheet absent period is effected to the transfer roller with the current of 2 micro-amperes, the voltage applied during the sheet present period is approximately 2300 V. By performing the constant voltage control with the voltage provided by multiplying this voltage by 1.3 (approximately 3000 V). During the solid black image transfer, the current is 1 micro-ampere.

In this manner, by constant-current-controlling the transfer roller during the transfer material absent period, and by obtaining the voltage across the transfer roller, the transfer characteristics depending on the ambient conditions can be obtained. Then, in order to apply the proper transfer bias voltage to the transfer roller during the transfer material present period, during actual image transfer operation period, above voltage is stored, and the voltage is multiplied by a coefficient which is different in accordance with the ambient conditions (for example, 1.1 under the H/H condition, 1.2 under the N/N condition, and 1.3 under the L/L condition). By applying the resultant voltage to the transfer roller during the image transfer operation, the transfer current becomes sufficient so as not to give rise to the improper image transfer. This is effective to compensate the ambient condition change in the transfer roller.

The constant current control for the transfer roller is effected during at least a part of the period in which the transfer material is not present in the transfer station.

In this embodiment, the constant voltage by the constant voltage control during the sheet present period is provided by multiplying by the stored voltage which appears across the transfer roller during the sheet absent period, that is, the constant current control period by a coefficient. The coefficient is determined on the basis of the V-I characteristics of the transfer roller and is not limited to 1.1 under the H/H condition, 1.2 under the N/N condition and 1.3 under the L/L condition.

Figure 16:
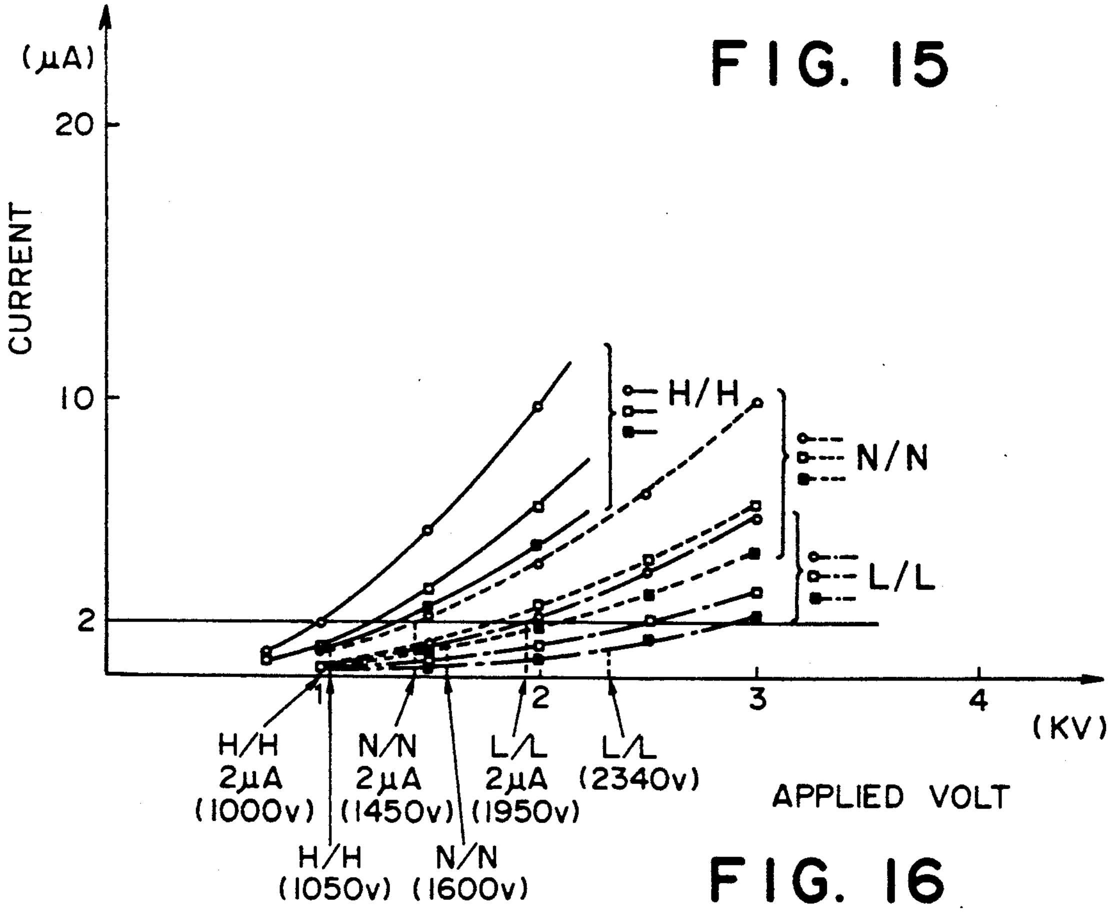

FIG. 16 shows the V-I characteristics when the transfer roller has a resistance lower than the resistance of the transfer roller used in the foregoing. In this case, the proper coefficient is 1.05 under the H/H condition, 1.1 under the N/N condition and 1.2 under the L/L condition. As will be understood, the proper coefficients are different depending on the resistance of the transfer roller.

Figure 17:
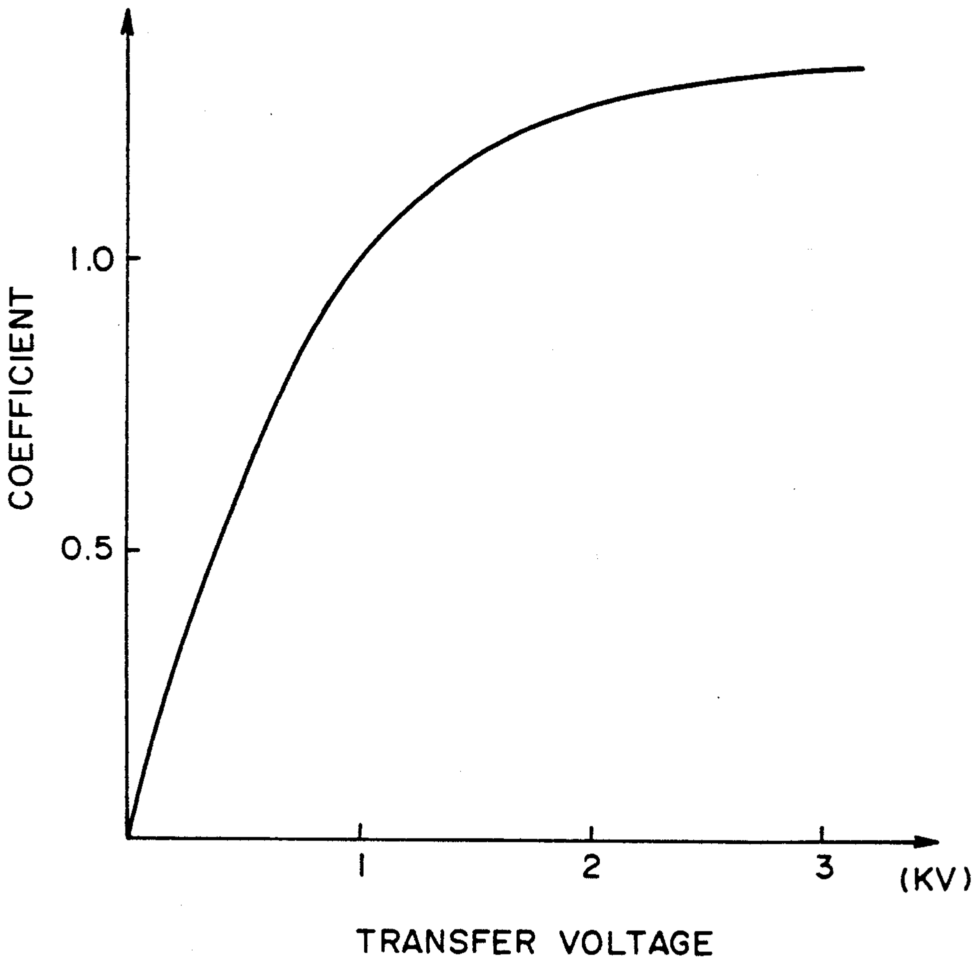
FIG. 17 is a graph showing a relation between a voltage applied to the transfer roller and a coefficient.

In the foregoing embodiment, in order to detect the ambient condition in one method or another for the purpose of applying a proper voltage to the transfer roller depending on the ambient condition during the sheet present period, and the coefficient to be multiplied has to be determined. One method therefor, uses a voltage detection. The transfer roller is subjected to the constant current control during the transfer material absent period by the voltage source 4, and the voltage of the voltage source 4 is stored. The voltage is detected and the coefficient is determined for each of the detected voltages using a variable resistor or the like. The determination of the coefficients is carried out on the basis of the characteristics shown in the graph, that is, the relationship between the stored voltage and the coefficient prepared beforehand, as shown in FIG. 17. The change or variation of the resistance of the transfer roller depending on the ambient condition is mainly influenced by the humidity. And therefore, a proper transfer voltage can be provided so as to determine the coefficient on the basis of the stored voltage under all humidity conditions.

Figure 18:
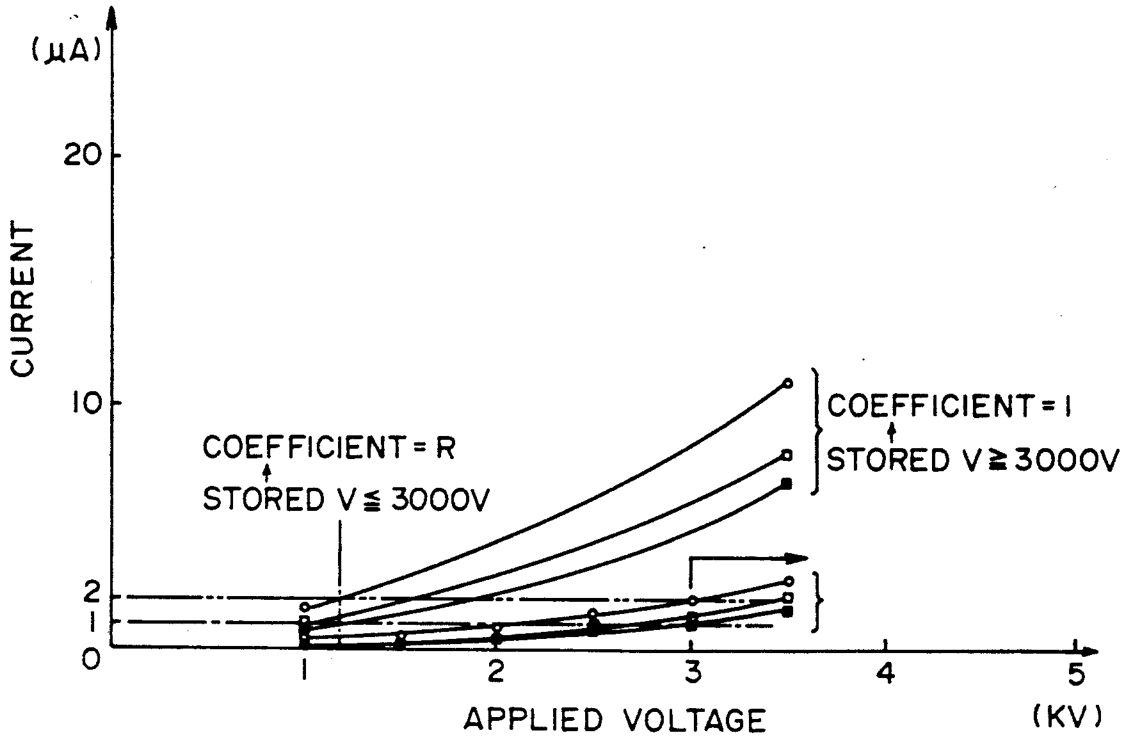

In this example, the voltage stored during the constant current control (sheet absent) period corresponds to each of coefficients in FIG. 17. Another effective method is that the stored voltage is divided by a certain unit, and the same coefficient is selected for the voltages in one of the divided region. For example, referring to FIG. 18, the stored voltage during the 2 micro-ampere constant current control is approximately 3000 V, and the transfer current required for transferring the toner image substantially all the surface of the transfer material, is approximately 1 micro-ampere. In this case, it is possible, for example, the coefficient is 1 if the stored voltage is not less than a predetermined voltage (3000 V in FIG. 18), and the coefficient is R (the coefficient is larger than 1 in FIG. 18) so that the transfer current required for transfer the toner onto substantially the entire surface of the transfer material is not less than 1 micro-ampere (improper transfer). Thus, in this case, the stored voltage region is divided into two regions, that is, not less than 3000 V and less than 3000 V, wherein in the former region, the coefficient is 1, and in the latter region, it is R.

In all of the foregoing embodiments, the constant current control is effected to the transfer roller when the transfer material is not present in the transfer station, and the coefficient is determined on the voltage during the constant current control. It is possible, however, that the constant voltage control is effected to the transfer roller during the transfer material absent period at the transfer station, and the coefficient is determined on the basis of the current detected during the constant voltage control.

Such an example will be described.

Figure 11:
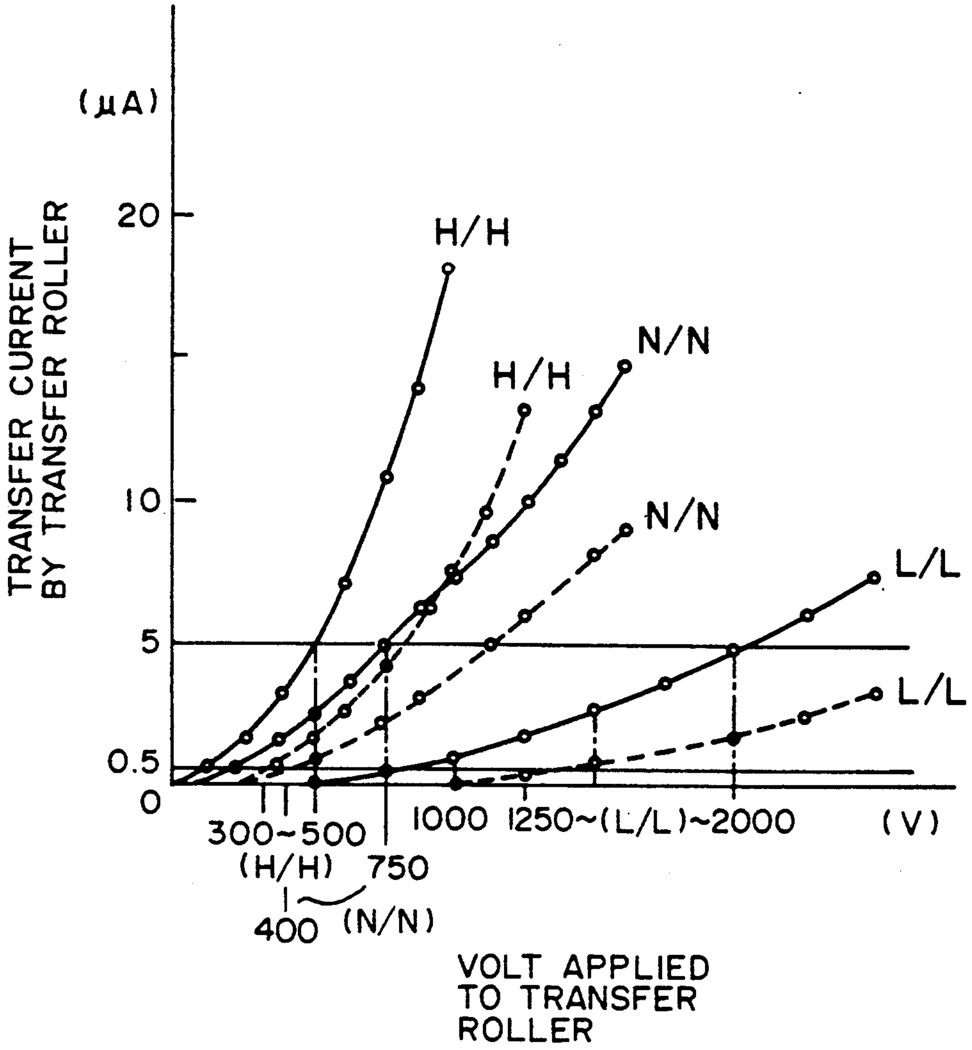
Figure 19:
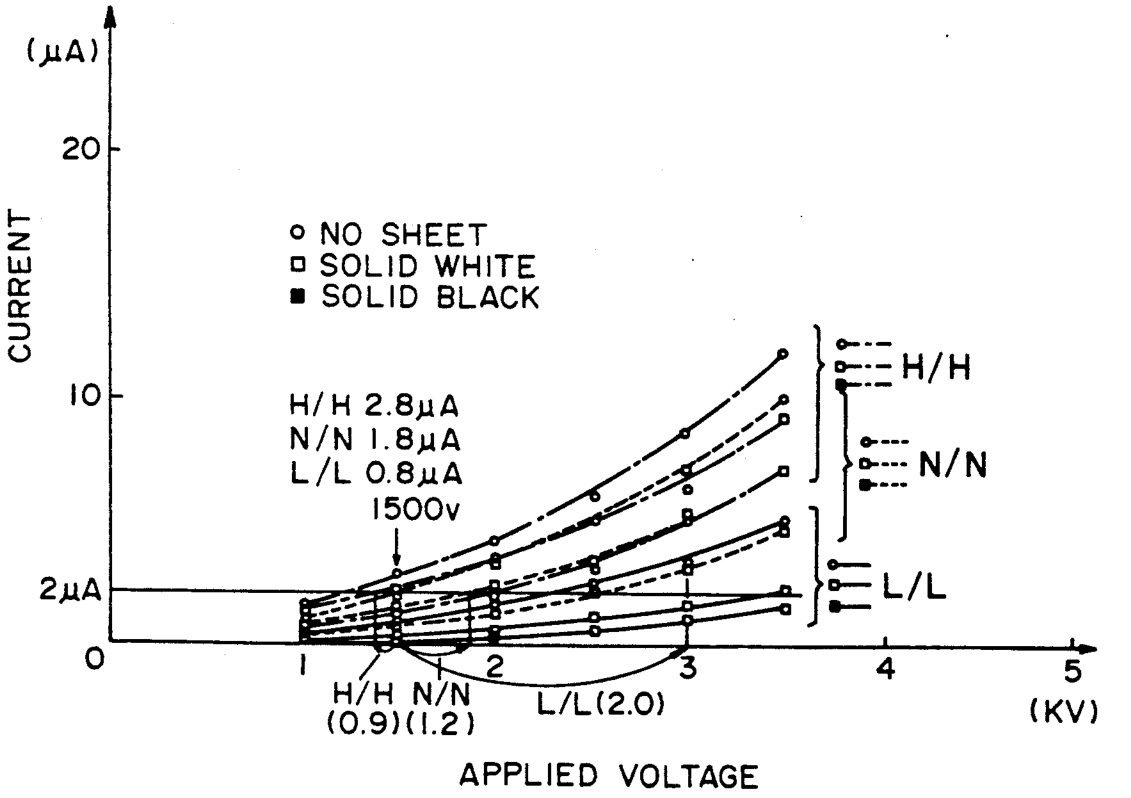

Referring to FIG. 11, the transfer roller is constant-voltage-controlled with 1500 V during the transfer material absent period. The current through the transfer roller is 2.8 micro-ampere under the H/H condition, 1.8 micro-ampere under the N/N condition and 0.8 micro-ampere under the L/L condition. The currents are detected, and the coefficients to be multiplied by 1500 V are determined on the basis of the detected currents. In the example of FIG. 19, the coefficient is 0.9 (1350 V) under the H/H condition, 1.2 (1800 V) under the N/N condition and 2.0 (3000 V under the L/L condition) by constant-voltage-controlling the transfer roller during the transfer material present period with the voltage obtained by multiplying the coefficient, the transfer current when the solid black image is to be transferred is approximately 1 micro-ampere. Similarly to the case of FIG. 18, the determination of the coefficient may be on the basis of the regions into which the detected current is divided.

In the foregoing embodiments as shown in FIG. 15 and 16, the relationship between the voltage applied to the transfer roller and the current flowing through the roller, that is, the V-I characteristics of the transfer roller has a larger inclination with increase of the humidity and the temperature. Therefore, the coefficient is preferably increased with the increase of the voltage or the current detected during the transfer material absent period.

In the foregoing Figures illustrating the sequence operations, the movement time of the photosensitive member is not shown. Therefore, even if the laser exposure timing and the transfer roller voltage application timing are the same, it means that the voltage application of the transfer roller starts when the position of the photosensitive member where the laser exposure is started reaches the transfer station.

A further embodiment of the present invention will be described. In this embodiment, the process speed of the photosensitive member is 92 mm/sec. The transfer roller 2 comprises a core metal having a diameter of 8 mm and an intermediate resistance material including EPDM in which carbon is dispersed so as to provide the volume resistivity $10^7$-$10^{10}$ ohm.cm and a hardness of 25-30 degrees (Asker C hardness), applied on the core metal so as to provide the outer diameter of 20 mm.

The transfer roller is easily influenced by the ambient humidity. More particularly, when the roller having the length of 220 mm is press-contacted to a conductive flat plate so as to produce a nip having a nip width of 2 mm, and a voltage of 1 KV is applied across them to measure the resistance. It is approximately $10^9$ ohm under the L/L condition, $4\times10^8$ ohm under the N/N condition and $5\times10^7$ ohm under the H/H condition. This has been confirmed through experiments.

During the pre-rotation, and the sheet interval period between adjacent transfer materials when the printing operation is performed continuously, a voltage having a polarity the same as that of the charger 3 is applied to the transfer roller 2, and a current through the transfer roller at this time is obtained. From the current the resistance of the roller under the condition is predicted, and on the basis of that, the proper bias voltage is applied during next sheet passage period.

Figure 20:
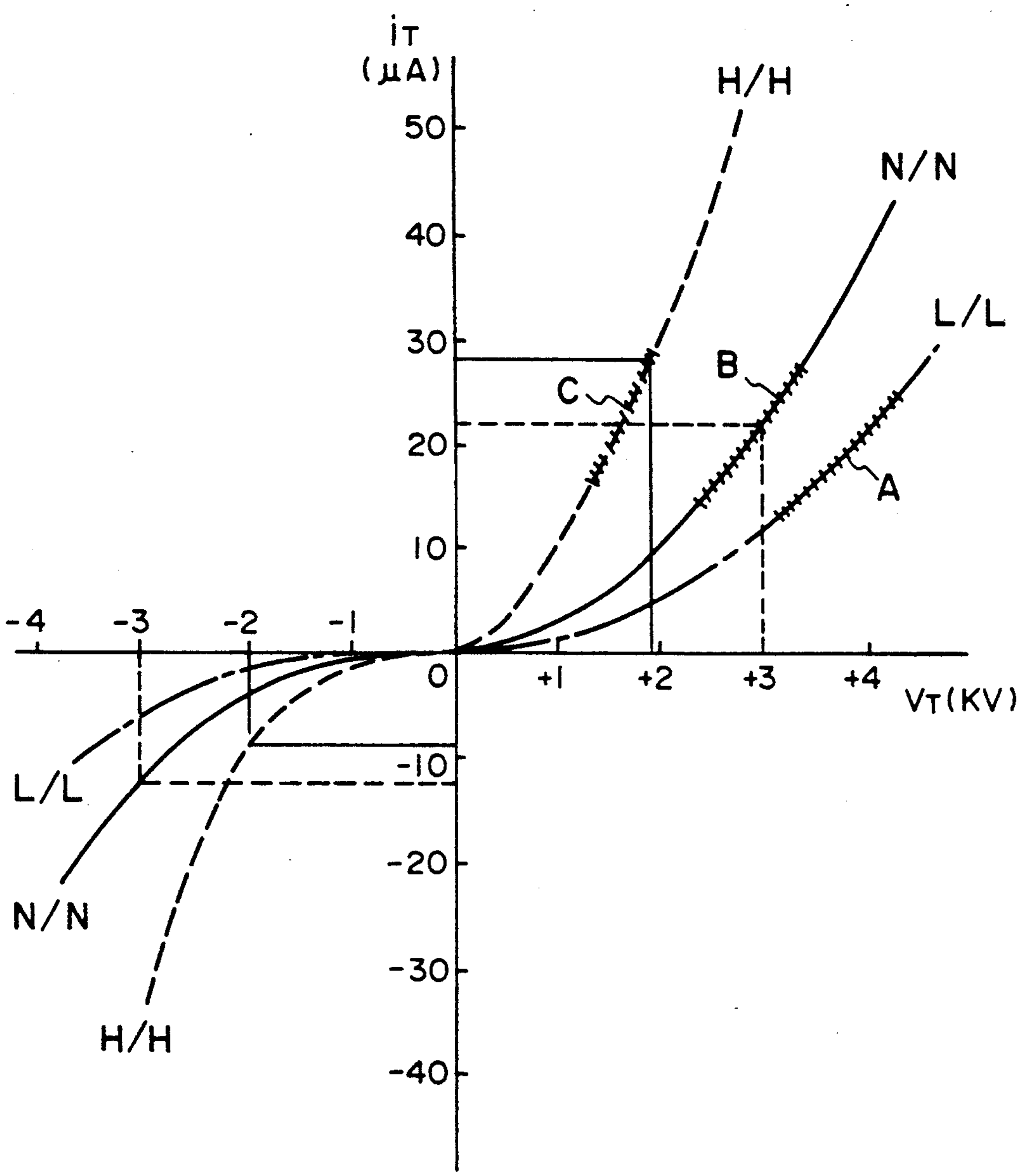

FIG. 20 shows the relationship between the current and the voltage with respect to the transfer member 1 and the transfer roller 2. In this Figure, A, B and C represent the regions in which the image transfer is good under the L/L condition, the N/N condition and the H/L condition.

The reason why the current is small when the transfer roller is supplied with the negative voltage is that the transfer material has been charged to the negative polarity (normally −600 V), and that the photosensitive member and the transfer roller have a slight rectification property.

Figure 21:
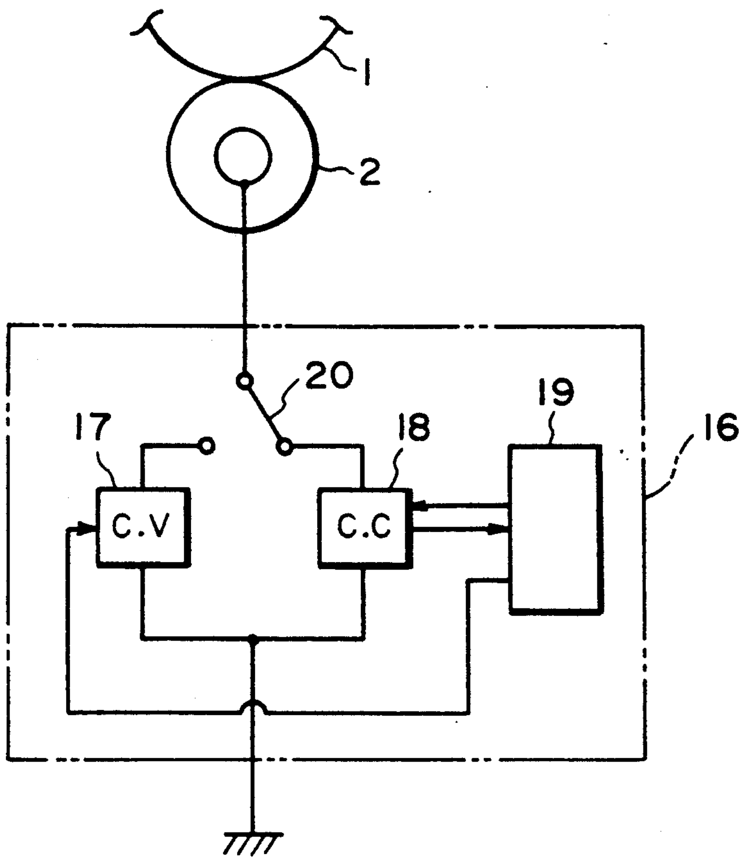

In FIG. 21, a bias voltage applying means 16 for applying the bias voltage to the transfer roller 2 includes a positive constant voltage source 17, a negative constant current source 18, a controller 19 for determining the current level of the constant current control and for detecting the voltage of the source 18 and for determining voltage of the constant voltage source 17, and a switch 20 for switching over the voltage sources.

In this embodiment, the transfer roller is subjected to the constant current control with the current of −10 micro-ampere during the sheet absent period, that is, the transfer material is not present in the transfer station.

As will be understood from the graph of FIG. 20, the voltage across the transfer roller at this time changes between −3.5 KV−−2 KV. In this case, the voltage proper for the image transfer is indicated as a hatched region in the positive voltage area in FIG. 20. It changes between +3.7−+1.7 KV depending on the ambient conditions.

Figure 22:
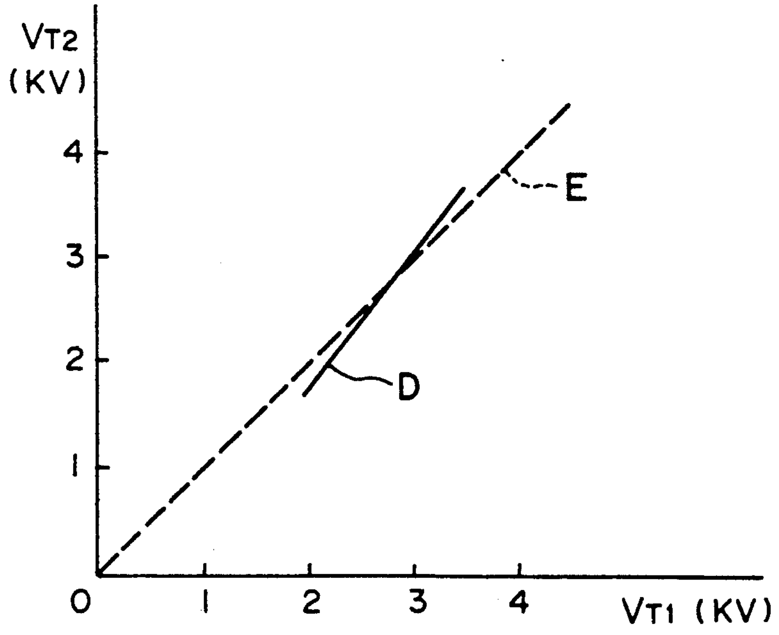
FIG. 22 is a graph showing a relation between a voltage detected during the constant current control of the transfer roller and an optimum transfer bias voltage.

This is shown in FIG. 22 by the solid line D. In this Figure, the abscissa represents the output voltage $V_{T1}$ (negative voltage) of the constant current source 18, and the ordinate represents the optimum transfer voltage $V_{T2}$ (positive voltage predicted from the output voltage).

A broken line E approximates the solid line D. Using the broken line E, the controller 19 can easily determine the voltage to be applied by the constant voltage source 17 on the basis of the output voltage $V_{T1}$ of the constant current source 18 by $V_{T2}=-\alpha\times V_{T1}$ ($\alpha$ is constant and larger than 1).

The voltage $V_{T1}$ is detected during the constant current control to the transfer roller with the current of −10 micro-ampere during the transfer material absent period. The voltage $V_{T1}$ at this time is detected, and the voltage $V_{T2}$ is obtained on the basis of the voltage $V_{T1}$, and the voltage $V_{T2}$ is applied during the subsequent actual transfer operation, that is, during the transfer material present period.

As will be understood from FIG. 20, the optimum transfer bias level considerably changes depending on the change in the ambient condition, but the current $i_T$ is concentrated around the neighborhood of 20 micro-ampere. In other words, the parameter for determining the optimum transfer bias can be said to be the current.

In this embodiment, as contrasted to the foregoing embodiment, the transfer memory does not occur because during the sheet absent period, the negative current which is the same polarity as the charging polarity of the charger flows through the transfer roller.

Particularly in the laser beam printer, it is usual that an APC control is effected during the sheet interval period so as to provide the constant amount of exposure in the laser exposure. In such a case, a portion of the photosensitive member corresponding to a part of the sheet interval is exposed to the laser beam, so that the potential thereof attenuates down to the right-portion potential, that is, approximately −100 V. If this portion is positively charged by the transfer roller, the transfer memory is produced more easily than at the dark potential portion not exposed (approximately −600 V). By this, the image quality deteriorations such as the foggy background or the too much image density at the half tone area are produced. However, this can be avoided according to this embodiment.

The transfer memory preventing effect is provided, of course, even when the APC control is not effected.

By applying the voltage to the transfer roller, the voltage having the opposite polarity to the polarity applied during the transfer operation, that is, the same polarity as the charging polarity of the toner, force is produced to return the toner from the surface of the roller to the photosensitive member. That is, there is provided the effect of cleaning the transfer roller.

This embodiment may be combined with the foregoing embodiments. More particularly, the sequential operation of this embodiment is made as shown in FIGS. 2, 4, 5, 6, 8 or 12–14.

In the foregoing description, the rotatable member for the image transfer operation is in the form of a roller, but it may be in the form of a belt. The developing operation is not limited to the reverse-development operation, but may be the regular development wherein the portion of the photosensitive member not exposed to the light and having the high potential portion receive the toner charged to the polarity opposite to the charging polarity of the photosensitive member. The same advantages can be provided in these cases.

However, in the case of the reverse development, since the charging polarity of the photosensitive member and the transfer bias polarity are opposite to each other, the charging memory due to the transfer bias more easily occurs, and therefore, the present invention is more effective.

As described in the foregoing, according to the present invention, the image forming apparatus is provided with an image bearing member and an image transfer means faced or press-contacted thereto, wherein good image transfer operation can be stably performed at all times under any ambient condition and for different sizes of the transfer materials, and therefore, the good quality images can be provided.

While the invention has been described with reference to the structures disclosed herein, it is not confined to the details set forth and this application is intended to cover such modifications or changes as may come within the purposes of the improvements or the scope of the following claims.

What is claimed is:

1. An image forming apparatus, comprising:

a movable image bearing member;

image forming means for forming a toner image on said image bearing member;

image transfer means for transferring the toner image from said image bearing member to an image recording material at an image transfer station, wherein said transfer means includes a charging member opposing said image bearing member and means for applying a voltage to the charging member, wherein said voltage applying means applies a voltage to said charging member so that the charging member is controlled at a constant voltage when an image region of said image bearing member is in the transfer station, and the charging member is controlled at a constant current during at least a part of a period when the image region is not in the transfer station, wherein a voltage V2 applied during the constant voltage control is equal to a voltage V1 appearing in said transfer means during the constant current control multiplied by a coefficient R, in which R is larger than 1.

2. An apparatus according to claim 1, wherein the image region is the region of said image bearing member wherein the toner image is formed.

3. An apparatus according to claim 1, wherein the image region is the region of said image bearing member which is contacted to the image recording material.

4. An apparatus according to claim 1, wherein said image forming means includes latent image forming means for forming a latent image on said image bearing member and developing means for developing the latent image with toner.

5. An apparatus according to claim 1, wherein said at least part of the period is before the image region is in the transfer station.

6. An apparatus according to claim 5, wherein the constant voltage control is effected with the voltage V2 unchanged, until a predetermined number of image regions of said image bearing member pass through the transfer station.

7. An apparatus according to claim 5, wherein the constant voltage control is effected with the voltage V1 when a predetermined number of non-image regions subsequent to the image regions of said image bearing member pass the transfer station.

8. An apparatus according to claim 1, wherein said charging member is contactable to said image bearing member.

9. An apparatus according to claims 1 or 8, wherein said charging member is a rotatable member.

10. An apparatus according to claim 9, wherein said charging member is in the form of a roller.

11. An apparatus according to claim 1, where the constant current control is effected when the image recording material is absent at the transfer station.

12. An apparatus according to claim 4, wherein said image bearing member is a photosensitive member, and said latent image forming means includes charging means for charging the photosensitive member and exposure means for exposing the photosensitive member charged by the charging means to light in accordance with image information.

13. An apparatus according to claim 12, wherein said photosensitive member has an OPC photoconductive member.

14. An apparatus according to claims 12 or 13, wherein the voltage applied by said voltage applying means during the constant voltage control has a polarity which is opposite to a charge polarity of the latent image.

15. An apparatus according to claims 12 or 13, wherein the voltage applied by the voltage applying means during the constant current control has a polarity which is opposite to a charge polarity of the latent image.

16. An apparatus according to claim 14, wherein the voltage applied by the voltage applying means during the constant current control has a polarity which is opposite to a charge polarity of the latent image.

17. An apparatus according to claim 12, wherein said exposure means exposes the photosensitive member to laser beam modulated in accordance with image signal corresponding to the image information.

18. An apparatus according to claim 15, wherein a region of said image bearing member which is in the transfer station when the constant current control is effected, has been charged by said charging means.

19. An apparatus according to claim 1, wherein the constant voltage control with the voltage V2 is effected from the time when an image formation starting signal is produced, and when another image formation start signal is produced within a predetermined time period from the first mentioned production of the image formation start signal, the constant voltage control with the voltage V2 is effected to the charging member when the image region of said image bearing member is in the transfer station.

20. An apparatus according to claim 19, wherein only when said another image forming signal is produced after said predetermined period elapses, the constant current control is effected.

21. An apparatus according to claim 6, wherein only when a predetermined number of image regions of said image bearing member passes through the transfer station, the constant current control is effected.

22. An apparatus according to claim 1, wherein each time non-image regions following image regions of said image bearing member pass through the transfer station, the constant current control is effected.

23. An apparatus according to claim 1, wherein when a boundary region between an image recording material present region and an image recording material absent region passes through the transfer station, said voltage applying means applied the voltage so that said charging member is constant-voltage-controlled with voltage lower than the voltage V2.

24. An apparatus according to claim 23, wherein for the boundary region, said voltage applying means applies a voltage so that a constant voltage control is effected with a voltage which is not lower than the voltage V1 and lower than the voltage V2.

25. An apparatus according to claim 1, wherein the coefficient R is determined in accordance with the voltage V1.

26. An apparatus according to claim 25, wherein said coefficient R increases with the voltage V1.

27. An apparatus according to claim 1, wherein said charging member has a resistance changing in accordance with temperature and/or humidity.

28. An image forming apparatus, comprising:

a movable image bearing member;

image forming means for forming a toner image on said image bearing member;

a charging member opposed to said image bearing member to transfer the image from said image bearing member onto an image recording material at a transfer station, said charging member having a resistance which changes in accordance with at least one of ambient temperature and humidity;

voltage applying means for applying a voltage to said charging member, wherein said voltage applying means applies a voltage to said charging member to control at a constant voltage said charging member when an image region of said image bearing member is in the transfer station and to control at a constant current said charging member during at least part of a period when said image region is not in the transfer station, wherein during the constant current control, a voltage V1 corresponding to the voltage applied to the charging member is stored, and a voltage V2 during the constant voltage control is equal to the voltage V1 multiplied by a coefficient R, wherein the coefficient R is larger than 1.

29. An apparatus according to claim 28, wherein the image region is the region of said image bearing member wherein the toner image is formed.

30. An apparatus according to claim 29, wherein the image region is the region of said image bearing member which is contacted to the image recording material.

31. An apparatus according to claim 28, wherein said image forming means includes latent image forming means for forming a latent image on said image bearing member and developing means for developing the latent image with toner.

32. An apparatus according to claim 28, wherein said at least part of the period when said image region is not in the transfer station is the time before the image region is in the transfer station.

33. An apparatus according to claim 32, wherein the constant voltage control is effected with the voltage V2 unchanged, until a predetermined number of image regions of said image bearing member pass through the transfer station.

34. An apparatus according to claim 32, wherein the constant voltage control is effected with the voltage V1 when a predetermined number of non-image regions subsequent to the image regions of said image bearing member pass the transfer station.

35. An apparatus according to claim 28, wherein said charging member is contactable to said image bearing member.

36. An apparatus according to claims 28 or 35, wherein said charging member is a rotatable member.

37. An apparatus according to claim 36, wherein said charging member is in the form of a roller.

38. An apparatus according to claim 28, wherein the constant current control is effected when the image recording material is absent at the transfer station.

39. An apparatus according to claim 31, wherein said image bearing member is a photosensitive member, and said latent image forming means includes charging means for charging the photosensitive member and exposure means for exposing the photosensitive member charged by the charging means to light in accordance with image information.

40. An apparatus according to claim 39, wherein said photosensitive member has an OPC photoconductive member.

41. An apparatus according to claims 39 or 40, wherein the voltage applied by said voltage applying means during the constant voltage control has a polarity which is opposite to a charge polarity of the latent image.

42. An apparatus according to claims 39 or 40, wherein the voltage applied by the voltage applying means during the constant current control has a polarity which is opposite to a charge polarity of the latent image.

43. An apparatus according to claim 41, wherein the voltage applied by the voltage applying means during the constant current control has a polarity which is opposite to a charge polarity of the latent image.

44. An apparatus according to claim 39, wherein said exposure means exposes the photosensitive member to laser beam modulated in accordance with image signal corresponding to the image information.

45. An apparatus according to claim 40, wherein a region of said image bearing member which is in the transfer station when the constant current control is effected, has been charged by said charging means.

46. An apparatus according to claim 28, wherein the constant voltage control with the voltage V2 is effected from the time when an image formation starting signal is produced, and when another image formation start signal is produced within a predetermined time period from the first mentioned production of the image formation start signal, the constant voltage control with the voltage V2 is effected to the charging member when the image region of said image bearing member is in the transfer station.

47. An apparatus according to claim 46, wherein only when said another image formation signal is produced after said predetermined period elapses, the constant current control is effected.

48. An apparatus according to claim 33, wherein only when a predetermined number of image regions of said image bearing member passes through the transfer station, the constant current control is effected.

49. An apparatus according to claim 28, wherein each time non-image regions following image regions of said image bearing member pass through the transfer station, the constant current control is effected.

50. An apparatus according to claim 28, wherein when a boundary region between an image recording material present region and an image recording material absent region passes through the transfer station, said voltage applying means applies the voltage so that said charging member is constant-voltage-controlled with voltage lower than the voltage V2.

51. An apparatus according to claim 50, wherein for the boundary region, said voltage applying means applies a voltage so that a constant voltage control is effected with a voltage which is not lower than the voltage V1 and lower than the voltage V2.

52. An apparatus according to claim 28, wherein the coefficient R is determined in accordance with the voltage V1.

53. An apparatus according to claim 52, wherein said coefficient R increases with the voltage V1.

54. An apparatus according to claims 1 or 28, wherein said charging member is contactable to a back side of the recording material.

55. An image forming apparatus, comprising:

a movable image bearing member;

charging means for charging said image bearing member;

image forming means for forming a toner image on said image bearing member using electric charging;

transfer means for transferring the toner image from said image bearing member to an image recording material at a transfer station, wherein said transfer means includes a charging member contactable to a back side of the image recording material and means for applying a voltage to said charging member, wherein said voltage applying means controls at a constant voltage said charging member when an image region of said image bearing member is in the transfer station, and during at least a part of a period when the image region is not in the transfer station, said voltage applying means applies a voltage having a polarity which is the same as the charging polarity of said charging means to said charging member, and wherein a level of said constant voltage to be applied during the constant voltage control is determined when said voltage applying means applies the voltage which is the same as the charging polarity of said charging means to said charging member.

56. An apparatus according to claim 55, wherein the image region is the region of said image bearing member wherein the toner image is formed.

57. An apparatus according to claim 56, wherein the image region is the region of said image bearing member which is contacted to the image recording material.

58. An apparatus according to claim 55, wherein said image forming means includes latent image forming means for forming a latent image on said image bearing member and developing means for developing the latent image with toner.

59. An apparatus according to claim 55, wherein said at least part of the period is before the image region is in the transfer station.

60. An apparatus according to claim 59, wherein the constant voltage control is effected with the constant voltage unchanged, until a predetermined number of image regions of said image bearing member pass through the transfer station.

61. An apparatus according to claim 55, wherein said charging member is contactable to said image bearing member.

62. An apparatus according to claims 55 or 61, wherein said charging member is a rotatable member.

63. An apparatus according to claim 62, wherein said charging member is in the form of a roller.

64. An apparatus according to claim 55, wherein the constant voltage is determined during a period wherein the image recording material is absent in the transfer station.

65. An apparatus according to claim 55, wherein said image bearing member is a photosensitive member, and said apparatus further comprises image exposure means for exposing the photosensitive member charged by said charging means to light in accordance with image information.

66. An apparatus according to claim 65, wherein said photosensitive member has an OPC photoconductive member.

67. An apparatus according to claims 65 or 66, wherein the constant voltage applied by said voltage applying means during the constant voltage control has a polarity which is opposite to a charging polarity of said charging means.

68. An apparatus according to claim 65, wherein said exposure means exposes the photosensitive member to laser beam modulated in accordance with image signal corresponding to the image information.

69. An apparatus according to claim 55, wherein the constant voltage control with the constant voltage is effected from the time when an image formation starting signal is produced, and when another image formation start signal is produced within a predetermined time period from the first mentioned production of the image formation start signal, the constant voltage control with the constant voltage is effected to the charging member when the image region of said image bearing member is in the transfer station.

70. An apparatus according to claim 69, wherein only when said another image formation signal is produced after said predetermined period elapses, the constant voltage of the constant voltage control is determined.

71. An apparatus according to claim 60, wherein only when a predetermined number of image regions of said image bearing member passes through the transfer station, the constant voltage of the constant voltage control is determined.

72. An apparatus according to claim 55, wherein each time non-image regions following image regions of said image bearing member pass through the transfer station, the constant voltage of the constant voltage control is determined.

73. An apparatus according to claim 55, wherein said charging member has a resistance which changes in accordance with temperature and/or humidity.

74. An apparatus according to claim 55, wherein when said voltage applying means applies the voltage having the polarity which is the same as the charging polarity of said charging means to said charging member, said voltage applying means constant-current controls said charging member.

75. An apparatus according to claim 74, wherein the level of the constant voltage is determined in accordance with a voltage across said transfer means during the constant current control.

76. An image forming apparatus, comprising:

image forming means for forming an image on a recording material, said image forming means including an image bearing member, a charging member for opposing the image bearing member and power supply means for supplying electric power to the charging member;

constant current control means for supplying a constant current to the charging member; and voltage control means for supplying a constant voltage to the charging member, wherein the constant voltage $V_2$ is determined on the basis of a voltage $V_1$ which is provided when said constant current control means is operated, and wherein the voltage $V_2$ is larger than the voltage $V_1$.

77. An apparatus according to claim 76, wherein said charging member functions as an image transfer member contactable to a back side of the recording material to transfer the image from the image bearing member to the recording material in an image transfer station.

78. An apparatus according to claim 77, wherein said constant current control means supplies the predetermined current during at least a part of a period in which the image on the image bearing member is absent from the transfer station.

79. An apparatus according to claims 77 or 78, wherein said constant current control means supplies the predetermined current during at least a part of a period in which the recording material is absent from the transfer station.

80. An apparatus according to claim 78, wherein said voltage control means supplies the constant voltage to the charging member when the image on the image bearing member is in the transfer station.

81. An apparatus according to claim 79, wherein said voltage control means supplies the constant voltage to the charging member when the recording material is in the transfer station.

82. An apparatus according to claim 76, wherein the voltage $V_2$ is a function of the voltage $V_1$.

83. An apparatus according to claim 76, wherein when said constant current control means is operated, plural sampled voltage values are provided, and said voltage V2 is determined on the basis of the plural sampled voltage values.

84. An apparatus according to claim 83, wherein the voltage $V_2$ is determined as an average of the sampled voltages.

85. An apparatus according to claims 76, 83 or 84, wherein said charging member is a rotatable member.

86. An apparatus according to claim 81, wherein said image forming means further comprises a latent image forming means for forming a latent image on said image bearing member and developing means for developing the latent image, wherein charge polarity of the latent image is opposite from that of the current supplied by said constant current supply means.

87. An apparatus according to claim 86, wherein the charge polarity is opposite from the polarity of constant voltage supplied by said voltage control means.

88. An apparatus according to claim 76, wherein said image bearing member has an organic photoconductor.

89. An apparatus according to claim 86, wherein said image bearing member has an organic photoconductor.

90. An apparatus according to claim 87, wherein said image bearing member has an organic photoconductor.

91. An apparatus according to claim 82, wherein the voltage $V_2$ is provided by multiplying the voltage $V_1$ by a coefficient R.

92. An apparatus according to claims 82 or 91, wherein the function is different depending on the voltage $V_1$.

93. An apparatus according to claim 81, wherein when an end of recording material is in the transfer station, said voltage control means supplies a constant voltage which is smaller than the voltage $V_2$.

94. An apparatus according to claim 82, wherein an end of recording material is in the transfer station, said voltage control means supplies a constant voltage which is smaller than the voltage $V_2$.

95. An image forming apparatus, comprising:

image forming means for forming an image on a recording material, said image forming means including an image bearing member, a charging member opposing the image bearing member and power supply means for supplying electric power to the charging member;

constant current control means for supplying a constant current to the charging member so as to maintain a constant level of current flow from said charging member to said image bearing member; and image formation control means for controlling an image formation parameter of said image forming means on the basis of plural sampled voltage values provided when said constant current control means is operated.

96. An apparatus according to claim 95, wherein said charging member functions as an image transfer member contactable to a back side of the recording material to transfer the image from the image bearing member to the recording material in an image transfer station.

97. An apparatus according to claim 96, wherein said constant current control means supplies the predetermined current during at least a part of a period in which the image on the image bearing member is absent from the transfer station.

98. An apparatus according to claims 96 or 97, wherein said constant current control means supplies the predetermined current during at least a part of a period in which the recording material is absent from the transfer station.

99. An apparatus according to claim 95, wherein said image formation control means includes constant voltage control means for supplying a constant voltage to said charging member on the basis of the plural sampled voltage values.

100. An apparatus according to claim 97, wherein said image formation control means supplies a constant voltage to the charging member when the image on the image bearing member is in the transfer station.

101. An apparatus according to claim 98, wherein said image formation control means supplies a constant voltage to the charging member when the recording material is in the transfer station.

102. An apparatus according to claim 95, wherein image formation control means controls said image formation parameter on the basis of an average of the plural sampled voltage values.

103. An apparatus according to claims 99 or 100, wherein said image formation control means supplies a constant voltage to said charging member on the basis of an average of the plural sampled voltage values.

104. An apparatus according to claim 101, wherein said image formation control means includes a constant voltage control means for supplying a constant voltage to said charging member on the basis of an average of the plural sampled voltage values.

105. An apparatus according to claims 95, 99, 100 or 102 wherein said charging member is a rotatable member.

106. An apparatus according to claim 101, wherein said charging member is a rotatable member.

107. An apparatus according to claim 103, wherein said charging member is a rotatable member.

108. An image forming apparatus, comprising:

image forming means for forming an image on a recording material, said image forming means including an image bearing member, a charging member for opposing the image bearing member and power supply means for supplying electric power to the charging member;

voltage control means for supplying a constant voltage $V_1$ to the charging member; and image formation control means for controlling a parameter of image forming operation of said image forming means on the basis of a current provided when said voltage control means is operated.

109. An apparatus according to claim 108, wherein said charging member functions as an image transfer member contactable to a back side of the recording material to transfer the image from the image bearing member to the recording material in an image transfer station.

110. An apparatus according to claim 109, wherein said voltage control means supplies the predetermined voltage during at least a part of a period in which the image on the image bearing member is absent from the transfer station.

111. An apparatus according to claims 109 or 110, wherein said voltage control means supplies the predetermined voltage during at least a part of a period in which the recording material is absent from the transfer station.

112. An apparatus according to claim 108, wherein said image formation control means supplies a constant $V_2$ to said charging member, the constant voltage $V_2$ being determined on the basis of a current provided when said voltage control means is operated.

113. An apparatus according to claim 110, wherein said image formation control means supplies a constant voltage $V_2$ to the charging member when the image on the image bearing member is in the transfer station, the constant voltage $V_2$ being determined on the basis of a current provided when said voltage control means is operated.

114. An apparatus according to claim 111, wherein said image formation control means supplies the constant voltage $V_2$ to the charging member when the recording material is in the transfer station, the constant voltage $V_2$ being determined on the basis of a current provided when said voltage control means is operated.

115. An apparatus according to claims 112, 113 or 114, wherein the voltage $V_2$ is a function of the voltage $V_1$, the function being different depending on the current when said voltage control means is operated.

116. An apparatus according to claim 108, wherein said charging member is a rotatable member.

117. An image forming apparatus, comprising:

image forming means for forming an image on a recording material, said image forming means including an image bearing member, charging means for charging the image bearing member, a charging member contactable to image bearing member, and power supply means for supplying electric power to the charging member;

constant current control means for supplying a constant current to the charging member in a polarity the same as a charging polarity of said charging means; and image formation control means for controlling a parameter of image forming operation by said image forming means on the basis of a voltage provided when said current control means is operated.

118. An apparatus according to claim 117, wherein said charging member functions as an image transfer member contactable to a back side of the recording material to transfer the image from the image bearing member to the recording material in an image transfer station.

119. An apparatus according to claim 118, wherein said constant current control means supplies the predetermined current during at least a part of a period in which the image on the image bearing member is absent from the transfer station.

120. An apparatus according to claims 118 or 119, wherein said constant current control means supplies the predetermined current during at least a part of a period in which the transfer material is absent from the transfer station.

121. An apparatus according to claim 117, wherein said image formation control means includes voltage control means for supplying a constant voltage to said charging member, the constant voltage $V_2$ being determined on the basis of the voltage $V_1$ provided when said current control means is operated.

122. An apparatus according to claim 119, wherein said image formation control means supplies a constant voltage to the charging member when the image on the image bearing member is in the transfer station.

123. An apparatus according to claim 120, wherein said image formation control means supplies a constant voltage to the charging member when the recording material is in the transfer station.

124. An apparatus according to claim 117, wherein said charging member is a rotatable member.

125. An apparatus according to claim 123, wherein the charge polarity of said charging means is opposite from the polarity of the voltage supplied by said voltage control means.

126. An apparatus according to claim 117, wherein said image bearing member has an organic photoconductor.

127. An apparatus according to claim 125, wherein said image bearing member has an organic photoconductor.

128. An apparatus according to claims 1, 28, 74, 76 or 117, wherein the constant level of the current from said charging member to said image bearing member is maintained during constant current control..

* * * * *

UNITED STATES PATENT AND TRADEMARK OFFICE
CERTIFICATE OF CORRECTION

PATENT NO. : 5,179,397 Page 1 of 3

DATED : January 12, 1993

INVENTOR(S) : OHZEKI, et al.

It is certified that error appears in the above-identified patent and that said Letters Patent is hereby corrected as shown below:

IN THE DRAWINGS

FIGURE 2

"POLLER" (all occurrences) should read --ROLLER--.

COLUMN 3

Line 29, "transfer" should read --transfer.--

COLUMN 4

Line 12, "a" should be deleted.

COLUMN 10

Line 59, "to" should be deleted.

COLUMN 11

Line 56, "multiplies" should read --multiplied--.

UNITED STATES PATENT AND TRADEMARK OFFICE
CERTIFICATE OF CORRECTION

PATENT NO. : 5,179,397

DATED : January 12, 1993

INVENTOR(S) : OHZEKI, et al.

It is certified that error appears in the above-identified patent and that said Letters Patent is hereby corrected as shown below:

COLUMN 13

Line 20, "curing" should read --during--.

COLUMN 14

Line 58, "for" should read --to--.

COLUMN 19

Line 35, "applied" should read --applies--.

COLUMN 23

Line 9, "constant" (first occurrence) should be deleted.

COLUMN 25

Line 19, "means supplies a" should read --means includes a voltage current control means for supplying a--.

UNITED STATES PATENT AND TRADEMARK OFFICE
CERTIFICATE OF CORRECTION

PATENT NO. : 5,179,397

DATED : January 12, 1993

INVENTOR(S) : OHZEKI, et al.

It is certified that error appears in the above-identified patent and that said Letters Patent is hereby corrected as shown below:

COLUMN 25

Line 65, "constant" should read --constant voltage--.

COLUMN 26

Line 51, "transfer" should read --recording--.

Signed and Sealed this

Fourteenth Day of December, 1993

Attest:

Bruce Lehman

BRUCE LEHMAN

Attesting Officer

*Commissioner of Patents and Trademarks*